(12) United States Patent
Hayashi et al.

(10) Patent No.: US 12,019,932 B2
(45) Date of Patent: Jun. 25, 2024

(54) WORKFLOW SYSTEM, INFORMATION PROCESSING APPARATUS, QUALITY REPORT DATA CREATION METHOD, AND MEDIA

(71) Applicant: CANON KABUSHIKI KAISHA, Tokyo (JP)

(72) Inventors: Kimio Hayashi, Tokyo (JP); Yoshiji Kanamoto, Tokyo (JP); Toshihiko Iida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 17/826,114

(22) Filed: May 26, 2022

(65) Prior Publication Data
US 2022/0283762 A1 Sep. 8, 2022

Related U.S. Application Data

(63) Continuation of application No. PCT/JP2020/044711, filed on Dec. 1, 2020.

(30) Foreign Application Priority Data

Dec. 6, 2019 (JP) .................... 2019-221447

(51) Int. Cl.
*G06F 3/12* (2006.01)
*G06T 7/00* (2017.01)
*H04N 1/32* (2006.01)

(52) U.S. Cl.
CPC .......... *G06F 3/1259* (2013.01); *G06F 3/1207* (2013.01); *G06T 7/0004* (2013.01);
(Continued)

(58) Field of Classification Search
None
See application file for complete search history.

(56) References Cited

U.S. PATENT DOCUMENTS

| 2002/0032578 A1 | 3/2002 | Fukuda et al. |
| 2015/0077800 A1* | 3/2015 | Yamagishi ......... G06Q 30/0621 358/1.15 |

FOREIGN PATENT DOCUMENTS

| JP | H04197751 A | 7/1992 |
| JP | 2002092399 A | 3/2002 |

(Continued)

OTHER PUBLICATIONS

Print Quality eXchange (PQX) Specification, Idealliance, Jun. 2016.*
(Continued)

*Primary Examiner* — Fan Zhang
(74) *Attorney, Agent, or Firm* — ROSSI, KIMMS & McDOWELL LLP

(57) ABSTRACT

An information processing apparatus is provided, which performs: acquiring an inspection result obtained by inspecting quality of a print product; receiving quality request data including an evaluation criterion; specifying a quality level of the print product based on the evaluation criterion included in the quality request data and the inspection result; creating quality report data including the inspection result and the quality level; and transmitting the quality report data to a predetermined external apparatus.

13 Claims, 36 Drawing Sheets

(52) U.S. Cl.
CPC ..... *H04N 1/32545* (2013.01); *H04N 1/32662* (2013.01); *G06T 2207/30108* (2013.01); *G06T 2207/30168* (2013.01)

(56) References Cited

FOREIGN PATENT DOCUMENTS

| | | | |
|---|---|---|---|
| JP | 2005205797 | A | 8/2005 |
| JP | 2013246722 | A | 12/2013 |
| JP | 2016206691 | A | 12/2016 |
| JP | 2018116442 | A | 7/2018 |

OTHER PUBLICATIONS

International Search Report issued in Intl. Appln. No. PCT/JP2020/044711 dated Feb. 16, 2021. English translation provided.
Written Opinion issued in Intl. Appln. No. PCT/JP2020/044711 dated Feb. 16, 2021.
Extended European search report issued in European Appln. No. 20897177.0, dated Oct. 2, 2023.

* cited by examiner

FIG. 4

| | |
|---|---|
| BOOT LOADER | ~401 |
| OPERATING SYSTEM | ~402 |
| NETWORK CONTROL PROGRAM | ~403 |
| FIRST RECEPTION PROGRAM | ~404 |
| FIRST TRANSMISSION PROGRAM | ~405 |
| JDF FUNCTION PROGRAM | ~406 |
| PDF FUNCTION PROGRAM | ~407 |
| MEDIA MANAGEMENT PROGRAM | ~408 |
| SHEET COUNT PROGRAM | ~409 |
| INSPECTION PROGRAM | ~410 |

FIG. 5

| | |
|---|---|
| BOOT LOADER | 501 |
| OPERATING SYSTEM | 502 |
| NETWORK CONTROL PROGRAM | 503 |
| WEB SERVER | 504 |
| WORKFLOW CONTROL PROGRAM | 505 |
| DOCUMENT SUBMISSION SYSTEM PROGRAM | 506 |
| SECOND RECEPTION PROGRAM | 507 |
| SECOND TRANSMISSION PROGRAM | 508 |

FIG. 6

| | |
|---|---|
| BOOT LOADER | 601 |
| OPERATING SYSTEM | 602 |
| NETWORK CONTROL PROGRAM | 603 |
| WEB BROWSER | 604 |
| PDF CREATION PROGRAM | 605 |
| PRX CREATION PROGRAM | 606 |
| JDF CREATION PROGRAM | 607 |
| THIRD TRANSMISSION PROGRAM | 608 |
| THIRD RECEPTION PROGRAM | 609 |

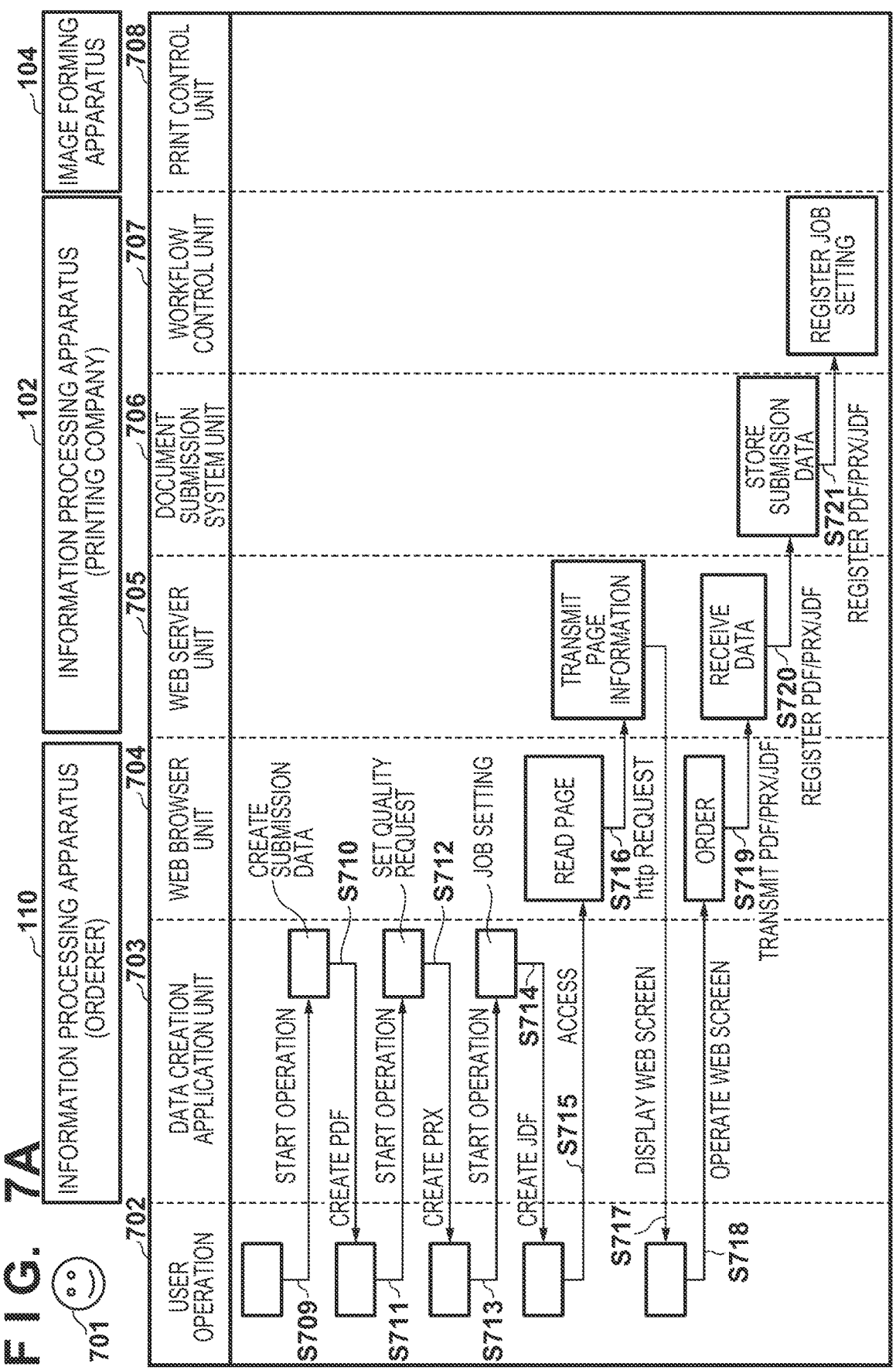

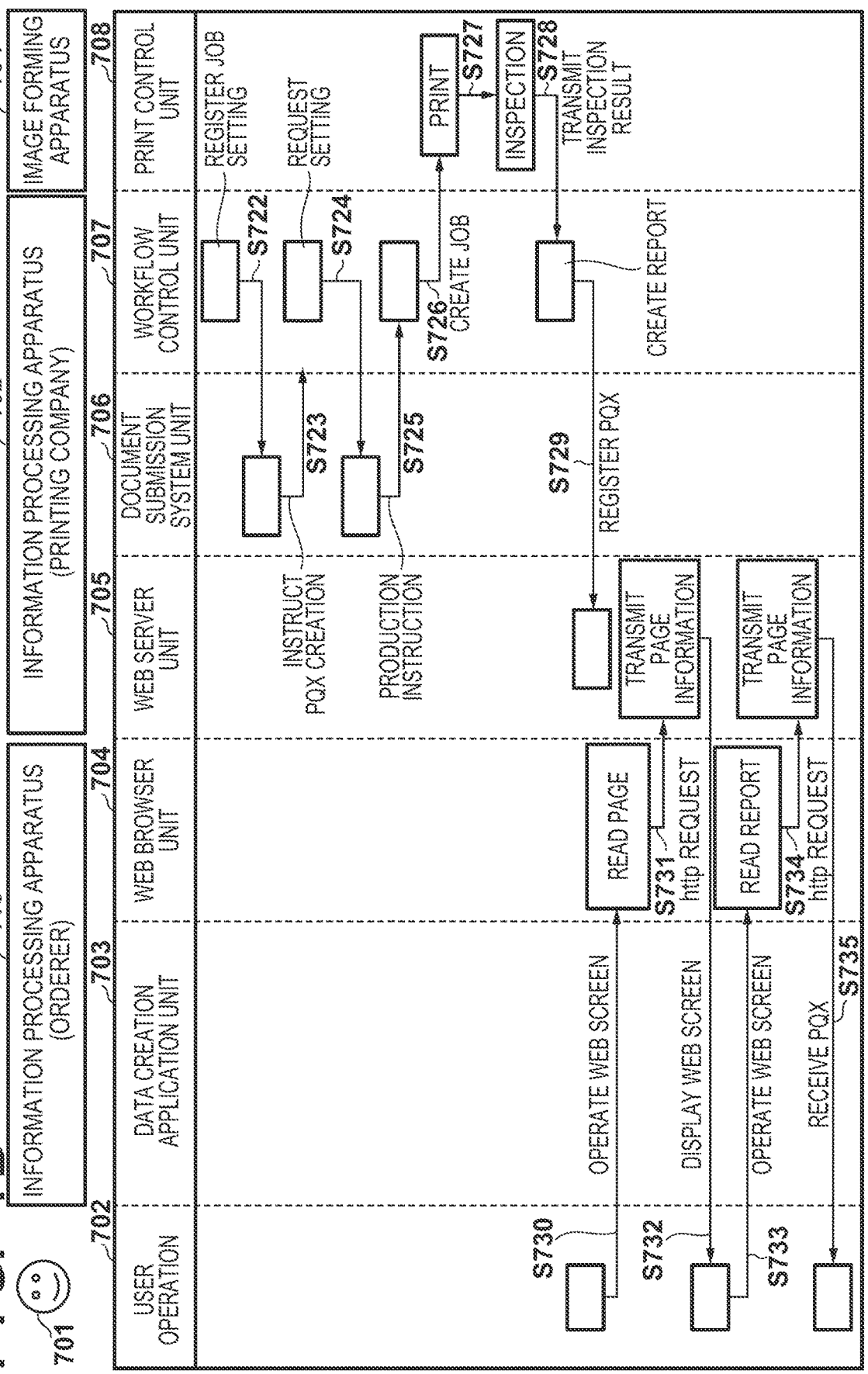

FIG. 10B

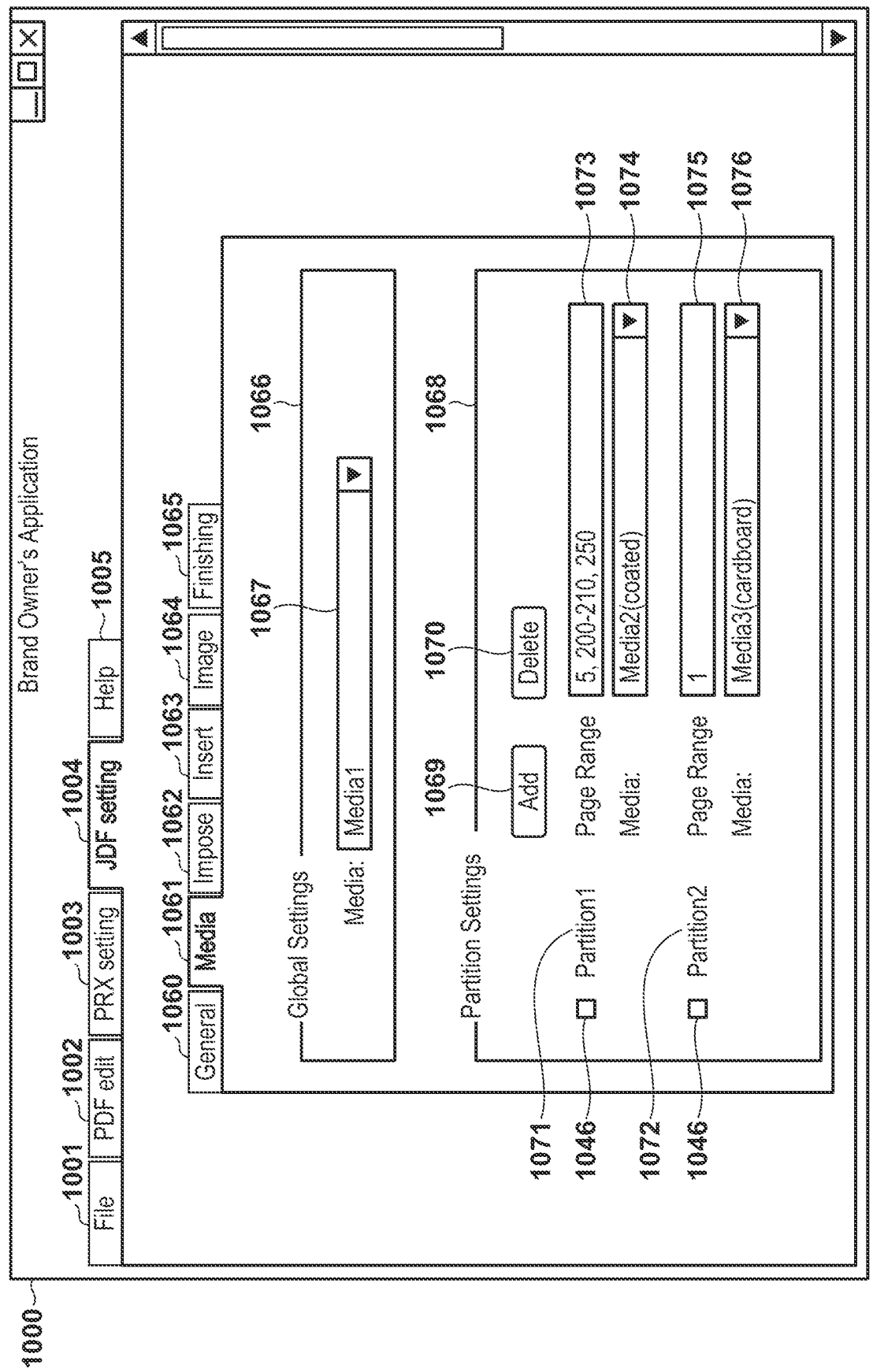

FIG. 12A

```
<?xml version="1.0" encoding="UTF-8"?>
<JDF ID="ID01" JobPartID="JobPartID01" Type="Combined"
 Types="LayoutPreparation Imposition Interpreting Rendering DigitalPrinting"
 Activation="Active" Status="Ready" Version="1.3" Category="DigitalPrinting"
 ICSVersions="IDP_L1-1.0 Base_L1-1.0" MaxVersion="1.3"
 xmlns="http://www.CIP4.org/JDFSchema_1_1"
 xmlns:cj="http://www.canon.com/ns/CanonJDF"
 JobID="JobID01" DescriptiveName="ProductAAA">

<ResourcePool>

<RunList Class="Parameter" ID="IDRL" Status="Available" PartIDKeys="Run">
   <RunList Run="0">
    <LayoutElement>                                            1201
     <FileSpec MimeType="application/pdf" URL="cid:Sample" TotalPage="250"/>
    </LayoutElement>
   </RunList>
  </RunList>
  <DigitalPrintingParams Class="Parameter" ID="IDDPP" Status="Available"
1202 Collate="SheetSetAndJob" PartIDKeys="RunIndex" Amount="2000000" Lot="1000">
   <MediaRef rRef="MED_000"/> ~1204                  1203       1287
1206
   <DigitalPrintingParams RunIndex="4 199~209 249">
    <MediaRef rRef="Med_001"/>        1205
   </DigitalPrintingParams>    1207
1208
   <DigitalPrintingParams RunIndex="0">
    <MediaRef rRef="Med_002"/>   1209
   </DigitalPrintingParams> 1210

</DigitalPrintingParams>                              1212
1211
  <Media ID="MED_000" Class="Consumable" Status="Available" Dimension="842 1191"
1214 DesciptiveName="Media1"/>~1213
  <Media ID="MED_001" Class="Consumable" Status="Available" Dimension="842 1191"
1217 DesciptiveName="Media2(coated)"/>~1216             1215
  <Media ID="MED_002" Class="Consumable" Status="Available" Dimension="842 1191"
   DescriptiveName="Media3(cardboard)"/>
                                                            1218
                             1219
 </ResourcePool>
 <ResourceLinkPool>

</ResourceLinkPool>
</JDF>
```

FIG. 12B

```
<?xml version="1.0" encoding="UTF-8"?>
<PRX xmlns:prx="http://xxx.org/prx" xmlns:cc="http://yyy.com/CxF" xmlns="http://zzz.org/prx"
xmlns:xsi="http://www.w3.org/2001/XMLSchema-instance"
xsi:schemaLocation="http://xxx.yyy.zzz.org/prx PRX.xsd">

<PRXInfo><PRXDate>2019-03-27</PRXDate><PRXId>xxx</PRXId></PRXInfo>     ⎫
<BuyerInfo><CompanyName>ABC Ltd.</CompanyName><Location>xxx</Location></BuyerInfo>  ⎬ 1220
                                                                                    ⎭
     <GradingInfo>   ~1221
1222 ~ <Grade DisplayLabel="Excellent" Rank="10"><ValueRange>
         <LogicalOperator>GT</LogicalOperator><CalculatedValue>8</CalculatedValue>
       </ValueRange></Grade>
1223 ~ <Grade DisplayLabel="Good" Rank="8"><ValueRange>
         <LogicalOperator>GT</LogicalOperator><CalculatedValue>7</CalculatedValue>
       </ValueRange></Grade>
1224 ~ <Grade DisplayLabel="Acceptable" Rank="7"><ValueRange>
         <LogicalOperator>GT</LogicalOperator><CalculatedValue>6.5</CalculatedValue>
       </ValueRange></Grade>
1225 ~ <Grade DisplayLabel="Poor" Rank=""><ValueRange>
         <LogicalOperator>LT</LogicalOperator><CalculatedValue>6.5</CalculatedValue>
       </ValueRange></Grade>
1226 ~ <BasisOfCalculation><Formula>lambda(bc cs rg)(bc*(cs+rg*4)/5))</Formula></BasisOfCalculation>
       <MinimumAcceptableRank>8</MinimumAcceptableRank>     ~1227
       <DesiredRank>9</DesiredRank>     ~1228
     </GradingInfo>
```

FIG. 12C

```xml
<QualityGoals>
 <Color>——1229
  <ColorScore>
   <ScoringInfo>                            ——1237
    <MinimumAcceptableRank>8</MinimumAcceptableRank>
    <DesiredRank>10</DesiredRank>——1238
    <CalculationVariable>cs</CalculationVariable>——1239        1262
    <BasisOfCalculation><Formula>Compare('CxFReference', 'PQX measurement set')</Formula></BasisOfCalculation>
   </ScoringInfo>
   <ColorScoringScale>——1231
    <UoM>dE</UoM>
    <ParameterScore DisplayLabel="Excellent" Rank="10">——1233
     <ValueRange>
      <LogicalOperator>LT</LogicalOperator><CalculatedValue>1.0</CalculatedValue>
     <ValueRange>
    </ParameterScore>
    <ParameterScore DisplayLabel="Good" Rank="9">——1234
     <ValueRange>
      <LogicalOperator>LT</LogicalOperator><CalculatedValue>2.0</CalculatedValue>
     <ValueRange>
    </ParameterScore>
    <ParameterScore DisplayLabel="Acceptable" Rank="8">——1235
     <ValueRange>
      <LogicalOperator>LT</LogicalOperator><CalculatedValue>4.0</CalculatedValue>
     <ValueRange>
    </ParameterScore>
    <ParameterScore DisplayLabel="Poor" Rank="">——1236
     <ValueRange>
      <LogicalOperator>GT</LogicalOperator><CalculatedValue>5.0</CalculatedValue>
     <ValueRange>
    </ParameterScore>
   </ColorScoringScale>
  </ColorScore>
  <ColorParameter>
   <CxFReference>CXF1</CxFReference>——1232                        1240
   <SamplingPositionMatrix><UoM>mm</UoM><XPosition>12.34</XPosition><YPosition>5.23</YPosition></SamplingPositionMatrix>
  </ColorParameter>
 </Color>
```

FIG. 12D

```
<Registration> ~1241
  <UoM>mm</UoM> ~1242
  <ScoringInfo>                                          1243
    <ParameterScore DisplayLabel="Excellent" Rank="10"><ValueRange>
      <LogicalOperator>LT</LogicalOperator><CalculatedValue>0.002</CalculatedValue>
    </ValueRange><ParameterScore>
    <ParameterScore DisplayLabel="Acceptable" Rank="5"><ValueRange> ~1244
      <LogicalOperator>LT</LogicalOperator><CalculatedValue>0.005</CalculatedValue>
    </ValueRange><ParameterScore>                       1245
    <ParameterScore DisplayLabel="Poor" Rank=""><ValueRange>
      <LogicalOperator>GT</LogicalOperator><CalculatedValue>0.005</CalculatedValue>
    </ValueRange><ParameterScore>
  </ScoringInfo>                                        1246
  <MinimumAcceptableRank>5</MinimumAcceptableRank>
  <DesiredRank>10</DesiredRank> ~1247
  <CalculationVariable>rg</CalculationVariable> ~1248                    1249
  <SamplingPositionMatrix><UoM>mm</UoM><XPosition>3.00</XPosition><YPosition>3.00</YPosition>
  </SamplingPositionMatrix>
  <BasisOfCalculation><Formula>Compare('MinimumAcceptableRank', 'PQX measurement set')</Formula></BasisOfCalculation>
</Registration>
                                                                        1263
<Barcode> ~1250
  <BarcodeScore>                                                        1251
    <BarcodeScoringScale DisplayLabel="pass" Rank="1"><Value>1</Value></BarcodeScoringScale>
    <BarcodeScoringScale DisplayLabel="fail" Rank="0"><Value>0</Value></BarcodeScoringScale> ~1252
  <BarcodeScore>                        1253
  <MinimumAcceptableRank>1</MinimumAcceptableRank>
  <DesiredRank>1</DesiredRank> ~1254
  <CalculationVariable>bc</CalculationVariable> ~1255
  <SamplingPositionMatrix><UoM>mm</UoM><XPosition>200.00</XPosition><YPosition>100.00</YPosition>
  </SamplingPositionMatrix>
  <BasisOfCalculation><Formula>Compare('MinimumAcceptableRank', 'PQX measurement set')</Formula></BasisOfCalculation>
</Barcode>
                                                                        1264
</QualityGoals>

<CxFReferenceData> ~1257
  <CxF><Object ID="CXF1"> ~1258                                         1259
    <ReflectanceSpectrum>0.222 0.333 0.444 0.001 0.222 0.234 0.111 0.333 0.555 0.666 ... 0.222</ReflectanceSpectrum>
  </Object></CxF>
</CxFReferenceData>

<TagCollection> ~1260            1261
  <Tag Name="DeliveryMethod" Value="CutSheet"/>
</TagCollection>
</PRX>
```

FIG. 12E

```
MEASURED DATA:
DATE: 2019-3-27;
TIME: 11:45:00 JST:
SHEET COUNT: 500;             ⟋ 12651
SHEET LOCATION METERAGE: 221.35M;  ⟋ 12652
METADATA: (PDF Output Intent: Japan Color 2001 Coated);

SPECTRUM DATA:
0.222  ⎫
0.333  ⎪
0.444  ⎪
0.001  ⎪
0.222  ⎪
0.234  ⎬ ~ 12653
0.111  ⎪
0.333  ⎪
0.555  ⎪
0.666  ⎪
...    ⎪
0.222  ⎭
SPECTRUM DATA END:

REGISTRATION DATA:
X DIRECTION OFFSET: 0.001;  ⎫
Y DIRECTION OFFSET: 0.001;  ⎬ ~ 12654
REGISTRATION DATA END;

BARCODE TEST DATA:
RESULT: PASS; ⟋ 12655
BARCODE TEST DATA END;
```

FIG. 12F

```xml
<?xml version="1.0" encoding="UTF-8"?>
<PQX xmlns:pqx="http://xxx.org/pqx" xmlns:cc="http://yyy.com/CxF" xmlns="http://zzz.org/pqx"
xmlns:xsi="http://www.w3.org/2001/XMLSchema-instance"
xsi:schemaLocation="http://xxx.yyy.zzz.org/pqx PQX.xsd">

<PQXInfo><PQXDate>2019-03-27</PQXDate><PQXId>xxx</PQXId></PQXInfo>                    1267
 <PrinterInfo><CompanyName>AAA Printing Company</CompanyName><Location>xxxxx</Location></PrinterInfo>

<PressRunInfo>    1268
   <DatePrinted>2019-03-27</DatePrinted>
   <PrinterLotId>Lot No.3</PrinterLotId>                                                1269
   <RunLength TotalRolls="" TotalPackage="10" TotalMeterage="" UoM="sheet" TotalSheetCount="10000"/>
   <RunLength TotalRolls="10" TotalPackage="" TotalMeterage="2000" UoM="mt" TotalSheetCount=""/>
   <PrintMethod>ElectroPhotography</PrintMethod>                                        1270
   <PressOperator>Mr. Right</PressOperator>
   <PrinterJobNumber>JobID01</PrinterJobNumber>
   <TagCollection Name="Metadata">    1288
      <Tag>
         <Name>PDF Output Intent</Name>
         <Value>Japan Color 2001 Coated</Value>
      </Tag>
   </TagCollection>
 </PressRunInfo>

<ReporterCollection>....</ReporterCollection>    1271
 <CustomerCollection><Customer>ABC Ltd.</Customer></CustomerCollection>
```

FIG. 12G

```
<SampleCollection> ~1272
 <Sample>
  <SampleDescription>
    <RunPosition Roll="5" Sheet="" Meterage="1000" UoM="mt"/>  ~1273
    <RunPosition Roll="" Sheet="500" Meterage="" Lot="3" UoM="sheet"/>  ~1274
  </SampleDescription>

<ColorReport>  ~1275
    <Measurement Id="001">
      <CxFSampleObjectIdLink>CXF001</CxFSampleObjectIdLink>  ~1276
    </Measurement>                                                                    1277
    <SamplingPositionMatrix><UoM>mm</UoM><XPosition>12.34</Xposition><YPosition>5.23</Yposition>
  </ColorReport>

<RegistrationReport>  ~1278
    <UoM>mt</UoM>
    <XMaxOffset>0.001</XMaxOffset>  ~1279
    <YMaxOffset>0.002</YMaxOffset>  ~1280                                             1281
    <SamplingPositionMatrix><UoM>mm</UoM><XPosition>3.00</Xposition><YPosition>3.00</Yposition>
  </RegistrationReport>

<BarcodeReport>  ~1282
    <ISO2DVerification>
      <Decode>pass</Decode>  ~1283
    </ISO2DVerification>                                                              1284
    <SamplingPositionMatrix><UoM>mm</UoM><XPosition>200.00</Xposition><YPosition>100.00</Yposition>
  </BarcodeReport>

</Sample>
</SampleCollection>
```

FIG. 12H

```xml
<CxFSampleData>
  <CxF Id="CxF001"> ← 1285
    <ReflectanceSpectrum>0.221 0.330 0.443 0.001 0.221 0.235 0.110 0.330 0.559 0.662 ... 0.221</ReflectanceSpectrum>
  <CxF>   1286
</CxFSampleData>

<QualityResult> ← 1287
  <Color> ← 1288
    <ParameterScore DisplayLabel="Good" Rank="9">
      <ValueRange>
        <LogicalOperator>LT</LogicalOperator><CalculatedValue>2.0</CalculatedValue>
      <ValueRange>
    </ParameterScore>
  </Color>
  <Registration> ← 1289
    <ParameterScore DisplayLabel="Excellent" Rank="10">
      <ValueRange>
        <LogicalOperator>LT</LogicalOperator><CalculatedValue>0.002</CalculatedValue>
      </ValueRange>
    <ParameterScore>
  </Registration>
  <Barcode> ← 1290
    <BarcodeScoringScale DisplayLabel="pass" Rank="1"><Value>1</Value></BarcodeScoringScale>
  </Barcode>
</QualityResult>
</PQX>
```

FIG. 12I

```xml
<?xml version="1.0" encoding="UTF-8"?>
<PQX xmlns:pqx="http://xxx.org/pqx" xmlns:cc="http://yyy.com/CxF" xmlns="http://zzz.org/pqx"
xmlns:xsi="http://www.w3.org/2001/XMLSchema-instance"
xsi:schemaLocation="http://xxx.yyy.zzz.org/pqx PQX.xsd">

<PQXInfo><PQXDate>2019-03-27</PQXDate><PQXId>xxx</PQXId></PQXInfo>                          1267
<PrinterInfo><CompanyName>AAA Printing Company</CompanyName><Location>xxxxx</Location></PrinterInfo>

<PressRunInfo>  1268
  <DatePrinted>2019-03-27</DatePrinted>
  <PrinterLotId>Lot No.3</PrinterLotId>                                                     1269
  <RunLength TotalRolls="" TotalPackage="10" TotalMeterage="" UoM="sheet" TotalSheetCount="10000"/>
  <RunLength TotalRolls="10" TotalPackage="" TotalMeterage="2000" UoM="m" TotalSheetCount=""/>   1270
  <PrintMethod>ElectroPhotography</PrintMethod>
  <PressOperator>Mr. Right</PressOperator>
  <PrinterJobNumber>JobID01</PrinterJobNumber>
  <TagCollection Name="Metadata">  1288
    <Tag>
      <Name>PDF Output Intent</Name>
      <Value>Japan Color 2001 Coated</Value>
    </Tag>
  </TagCollection>
</PressRunInfo>

<ReporterCollection>....</ReporterCollection>   1271
<CustomerCollection><Customer>ABC Ltd.</Customer></CustomerCollection>
```

FIG. 12J

```xml
<SampleCollection>                                    1272
  <Sample>
    <SampleDescription>                               1273
      <RunPosition Roll="5" Sheet="" Meterage="1000" UoM="mt"/>
      <RunPosition Roll="" Sheet="500" Meterage="" Lot="3" UoM="sheet"/>   1274
    </SampleDescription>

1275
    <ColorReport>
      <Measurement Id="001">                          1276
        <CxFSampleObjectIdLink>CXF001</CxFSampleObjectIdLink>
      </Measurement>                                                       1277
      <SamplingPositionMatrix><UoM>mm</UoM><XPosition>12.34</Xposition><YPosition>5.23</Yposition>
    </ColorReport>

1278
    <RegistrationReport>
      <UoM>mt</UoM>
      <XMaxOffset>0.001</XMaxOffset>     1279
      <YMaxOffset>0.002</YMaxOffset>     1280                              1281
      <SamplingPositionMatrix><UoM>mm</UoM><XPosition>3.00</Xposition><YPosition>3.00</Yposition>
    </RegistrationReport>

1282
    <BarcodeReport>
      <ISO2DVerification>           1283
        <Decode>pass</Decode>
      </ISO2DVerification>                                                 1284
      <SamplingPositionMatrix><UoM>mm</UoM><XPosition>200.00</Xposition><YPosition>100.00</Yposition>
    </BarcodeReport>

</Sample>
</SampleCollection>
```

FIG. 12K

```
<CxFSampleData>
  <CxF Id="CxF001">  ←1285
    <ReflectanceSpectrum>0.221 0.330 0.443 0.001 0.221 0.235 0.110 0.330 0.559 0.662 ... 0.221</ReflectanceSpectrum>
  <CxF>           1286
</CxFSampleData>

<QualityResult>~1287
  <Color>~1288
    <ParameterScore DisplayLabel="Good" Rank="9">
      <ValueRange>
        <LogicalOperator>LT</LogicalOperator><CalculatedValue>2.0</CalculatedValue>
      <ValueRange>
    </ParameterScore>
  </Color>
  <Registration>~1289
    <ParameterScore DisplayLabel="Excellent" Rank="10">
      <ValueRange>
        <LogicalOperator>LT</LogicalOperator><CalculatedValue>0.002</CalculatedValue>
      </ValueRange>
    <ParameterScore>
  </Registration>
  <Barcode>~1290
    <BarcodeScoringScale DisplayLabel="pass" Rank="1"><Value>1</Value></BarcodeScoringScale>
  </Barcode>
  <GradingInfo>~1291
    <Grade DisplayLabel="Excellent" Rank="10">
      <ValueRange>
        <LogicalOperator>GT</LogicalOperator><CalculatedValue>8</CalculatedValue>
      </ValueRange>
    </Grade>
  </GradingInfo>
</QualityResult>
</PQX>
```

FIG. 12L

```xml
<?xml version="1.0" encoding="UTF-8"?>
<PRX xmlns:prx="http://xxx.org/prx" xmlns:cc="http://yyy.com/CxF" xmlns="http://zzz.org/prx"
xmlns:xsi="http://www.w3.org/2001/XMLSchema-instance"
xsi:schemaLocation="http://xxx.yyy.zzz.org/prx PRX.xsd">

<PRXInfo><PRXDate>2019-03-27</PRXDate><PRXId>xxx</PRXId></PRXInfo>
<BuyerInfo><CompanyName>ABC Ltd.</CompanyName><Location>xxx</Location></BuyerInfo>

<GradingInfo>
  <Grade DisplayLabel="Excellent" Rank="10"><ValueRange>   ← 1222
    <LogicalOperator>GT</LogicalOperator><CalculatedValue>8</CalculatedValue>
  </ValueRange></Grade>
  <BasisOfCalculation><Formula>lambda(bc cs rg)(bc*(cs+rg*4)/5))</Formula></BasisOfCalculation>
  <MinimumAcceptableRank>8</MinimumAcceptableRank>
</GradingInfo>

<QualityGoals>
 <Color>
  <ColorScore>
    <ScoringInfo>
      <MinimumAcceptableRank>8</MinimumAcceptableRank>   ← 1237
      <CalculationVariable>cs</CalculationVariable>
      <BasisOfCalculation><Formula>Compare('CxFReference', 'PQX measurement set')</Formula></BasisOfCalculation>
    </ScoringInfo>
    <ColorScoringScale>
     <UoM>dE</UoM>
     <ParameterScore DisplayLabel="Excellent" Rank="10">   ← 1233
       <ValueRange>
         <LogicalOperator>LT</LogicalOperator><CalculatedValue>1.0</CalculatedValue>
       <ValueRange>
     </ParameterScore>
```

FIG. 12M

```xml
        <ParameterScore DisplayLabel="Good" Rank="9">  ~1234
          <ValueRange>
            <LogicalOperator>LT</LogicalOperator><CalculatedValue>2.0</CalculatedValue>
          <ValueRange>
        </ParameterScore>
        <ParameterScore DisplayLabel="Acceptable" Rank="8">  ~1235
          <ValueRange>
            <LogicalOperator>LT</LogicalOperator><CalculatedValue>4.0</CalculatedValue>
          <ValueRange>
        </ParameterScore>
        <ParameterScore DisplayLabel="Poor" Rank="7">  ~1236
          <ValueRange>
            <LogicalOperator>GT</LogicalOperator><CalculatedValue>5.0</CalculatedValue>
          <ValueRange>
        </ParameterScore>
      </ColorScoringScale>
    </ColorScore>
    <ColorParameter>
      <CxFReference>CXF1</CxFReference>
      <SamplingPositionMatrix><UoM>mm</UoM><XPosition>12.34</XPosition><YPosition>5.23</YPosition></SamplingPositionMatrix>
    </ColorParameter>
  </Color>
</QualityGoals>

<CxFReferenceData>  ~1257
  <CxF><Object ID="CXF1">  ~1258                                                                    1259
    <ReflectanceSpectrum>0.222 0.333 0.444 0.001 0.222 0.234 0.111 0.333 0.555 0.666 ... 0.222</ReflectanceSpectrum>
  </Object></CxF>
</CxFReferenceData>
</PRX>
```

FIG. 12N

```xml
<?xml version="1.0" encoding="UTF-8"?>
<PRX xmlns:prx="http://xxx.org/prx" xmlns:cc="http://yyy.com/CxF" xmlns="http://zzz.org/prx"
xmlns:xsi="http://www.w3.org/2001/XMLSchema-instance"
xsi:schemaLocation="http://xxx.yyy.zzz.org/prx PRX.xsd">

<PRXInfo><PRXDate>2019-03-27</PRXDate><PRXId>xxx</PRXId></PRXInfo>
<BuyerInfo><CompanyName>ABC Ltd.</CompanyName><Location>xxx</Location></BuyerInfo>

<GradingInfo>
  <Grade DisplayLabel="Excellent" Rank="10"><ValueRange>    ←1222
    <LogicalOperator>GT</LogicalOperator><CalculatedValue>8</CalculatedValue>
  </ValueRange></Grade>
  <BasisOfCalculation><Formula>lambda(bc cs rg)(bc*(cs+rg*4)/5)</Formula></BasisOfCalculation>
  <MinimumAcceptableRank>8</MinimumAcceptableRank>
</GradingInfo>

<QualityGoals>
  <Color>
    <ColorScore>
      <ScoringInfo>    ←1237
        <MinimumAcceptableRank>8</MinimumAcceptableRank>
        <CalculationVariable>cs</CalculationVariable>
        <BasisOfCalculation><Formula>Compare('CxFReference', 'PQX measurement set')</Formula></BasisOfCalculation>
      </ScoringInfo>
      <ColorScoringScale>
        <UoM>dE</UoM>
        <ParameterScore DisplayLabel="Excellent" Rank="10">    ←1233
          <ValueRange>
            <LogicalOperator>LT</LogicalOperator><CalculatedValue>1.0</CalculatedValue>
          </ValueRange>
        </ParameterScore>
      </ColorScoringScale>
    </ColorScore>
    <ColorParameter>
      <CxFReference>CXF1</CxFReference>
      <SamplingPositionMatrix><UoM>mm</UoM><XPosition>12.34</XPosition><YPosition>5.23</YPosition></SamplingPositionMatrix>
    </ColorParameter>
  </Color>
</QualityGoals>

<CxFReferenceData>    ←1257
  <CxF><Object ID="CXF1">    ←1258
    <ReflectanceSpectrum>0.222 0.333 0.444 0.001 0.222 0.234 0.111 0.333 0.555 0.666 ... 0.222</ReflectanceSpectrum>    ←1259
  </Object></CxF>
</CxFReferenceData>
</PRX>
```

F I G. 14A

```xml
<?xml version="1.0" encoding="UTF-8"?>
<XJDF JobId="xxx" Types="QualityControl" ICSVersions="CusQC_L1-2.1"> ~1400
  <ResourceSet Name="QualityControlParams">
    <QualityControlParams QualityControlMethods="Inspection" Severity="10"/>
  </ResourceSet>
  <ResourceSet Name="QualityControlParams"> ~1401
1402~  <QualityControlParams QualityControlMethods="ColorSpectrophotometry" Severity="1">
      <ColorControlStrip>
        <Patch Spectrum="0.222 0.333 0.444 0.001 0.222 0.234 0.111 0.333 0.555 0.666 ... 0.222"/>
      </ColorControlStrip>
    </QualityControlParams>
  </ResourceSet>
  <ResourceSet Name="QualityControlParams"> ~1403
1404~  <QualityControlParams QualityControlMethods="ColorSpectrophotometry" Severity="2">
      <ColorControlStrip>
        <Patch Spectrum="0.222 0.333 0.444 0.001 0.222 0.234 0.111 0.333 0.555 0.666 ... 0.223"/>
      </ColorControlStrip>
    </QualityControlParams>
  </ResourceSet>
  <ResourceSet Name="QualityControlParams"> ~1405
1406~  <QualityControlParams QualityControlMethods="ColorSpectrophotometry" Severity="3">
      <ColorControlStrip>
        <Patch Spectrum="0.222 0.333 0.444 0.001 0.222 0.234 0.111 0.333 0.555 0.666 ... 0.224"/>
      </ColorControlStrip>
    </QualityControlParams>
  </ResourceSet>
  <ResourceSet Name="QualityControlParams"> ~1407
1408~  <QualityControlParams QualityControlMethods="ColorSpectrophotometry" Severity="4">
      <ColorControlStrip>
        <Patch Spectrum="0.222 0.333 0.444 0.001 0.222 0.234 0.111 0.333 0.555 0.666 ... 0.225"/>
      </ColorControlStrip>
    </QualityControlParams>
  </ResourceSet>
</XJDF>
```

F I G. 14B

```
<?xml version="1.0" encoding="UTF-8"?>
<XJMF>
  <Header ICSVersions="CusQC_L1-2.0" Time="2018-02-28T16:00:20+00:00"/>
  <SignalResource>
    <Header DeviceID="" Time="2018-02-28T16:00:20+00:00"/>
    <ResourceInfo JobID="Job-1234">
      <ResourceSet Name="QualityControlResult">
        <Resource>
          <Part SheetName="SHEET-1" Side="Front"/>
1409 ~~~ <QualityControlResult SourceDeviceID="PRESS_1" QualityControlMethod="ColorSpectrophotometry">
            <ColorMeasurement Spectrum="380 0.2760 390 0.3460 400 0.4320 410 0.6500 420 0.9350 430 1.0260 440
1.0200 450 0.9820 460 0.9580 470 0.9470 480 0.9320 490 0.9220 500 0.9145 510 0.9050 520 0.8925 530 0.8805 540 0.8735 550
0.8665 560 0.8590 570 0.8570 580 0.8565 590 0.8595 600 0.8620 610 0.8670 620 0.8760 630 0.8870 640 0.8990 650 0.9085 660
0.9150 670 0.9180 680 0.9190 690 0.9200 700 0.9230 710 0.9285 720 0.9320 730 0.9360"
              Lab="95.00 1.50 -6.00">
              <DeviceNColor Name="MyMultiColor" ColorList="0 0 0 0 0 0"/>
              <ColorMeasurementCondition DensityStandard="ANSIE" Illumination="D50"
                InkState="Wet" MeasurementFilter="None" Observer="2" SampleBacking="Black"
                IlluminationAngle="0" MeasurementAngle="45" MeasurementMode="M1"
                SpectralStart="380" SpectralEnd="730" SpectralResolution="10" />
            </ColorMeasurement>
          </QualityControlResult>
        </Resource>
      </ResourceSet>
    </ResourceInfo>
  </SignalResource>
</XJMF>
```

FIG. 14C

```
<ResourceInfo JobID="Job-1234">
 <ResourceSet Name="ColorantControl">
  <Resource>
   <ColorantControl>
    <DeviceNSpace Name="MyMultiColor" Separations="Cyan Magenta Yellow Black Orange Green Violet"/>
   </ColorantControl>
  </Resource>
 </ResourceSet>
</ResourceInfo>
<ResourceSet Name="QualityControlParams">  ← 1410
 <QualityControlParams QualityControlMethods="ColorSpectrophotometry" Severity="1">
  <ColorControlStrip>
   <Patch Spectrum="0.222 0.333 0.444 0.001 0.222 0.234 0.111 0.333 0.555 0.666 ... 0.222"/>
  </ColorControlStrip>
 </QualityControlParams>
</ResourceSet>
</SignalResource>
</XJMF>
```

FIG. 15A

```xml
<?xml version="1.0" encoding="UTF-8"?>
<PQX>
<SampleCollection>
<Sample>
<ColorReport>
<Measurement Id="001">
<CxFSampleObjectIdLink>CXF001</CxFSampleObjectIdLink>
</Measurement>
<SamplingPositionMatrix><UoM>mm</UoM><XPosition>12.34</XPosition><YPosition>5.23</YPosition>
</ColorReport>
<RegistrationReport>
<UoM>mt</UoM>
<XMaxOffset>0.001</XMaxOffset>
<YMaxOffset>0.002</YMaxOffset>
<SamplingPositionMatrix><UoM>mm</UoM><XPosition>3.00</XPosition><YPosition>3.00</YPosition>
</RegistrationReport>
<BarcodeReport>
<ISO2DVerification>
<Decode>pass</Decode>
</ISO2DVerification>
<SamplingPositionMatrix><UoM>mm</UoM><XPosition>200.00</XPosition><YPosition>100.00</YPosition>
</BarcodeReport>
</Sample>
</SampleCollection>
<CxFSampleData>
<CxF Id="CxF001">
<ReflectanceSpectrum>0.221 0.330 0.443 0.001 0.221 0.235 0.110 0.330 0.559 0.662 ... 0.221</ReflectanceSpectrum>
<CxF>
</CxFSampleData>
```

FIG. 15B

```xml
<QualityResult>
  <Color>
    <ParameterScore DisplayLabel="Good" Rank="9">
      <ValueRange>
        <LogicalOperator>LT</LogicalOperator><CalculatedValue>2.0</CalculatedValue>
      </ValueRange>
    </ParameterScore>
    <Reason>
      <CalculatedValue>1.5</CalculatedValue>                                          ~1501
      <BasisOfCalculation><Formula>Compare('CxfReference', 'PQX measurement set')</Formula></BasisOfCalculation>
    </Reason>
  </Color>
  <GradingInfo>                                                                       ~1502
    <Grade DisplayLabel="Excellent" Rank="10">
      <ValueRange>
        <LogicalOperator>GT</LogicalOperator><CalculatedValue>8</CalculatedValue>
      </ValueRange>
    </Grade>                                                                          ~1503
    <Reason>
      <CalculatedValue>9.8</CalculatedValue>                                          ~1504
      <BasisOfCalculation><Formula>lambda(bc cs rg)(bc*(cs+rg*4)/5))</Formula></BasisOfCalculation>  ~1505
    </Reason>
  </GradingInfo>
</QualityResult>
</PQX>
```

WORKFLOW SYSTEM, INFORMATION PROCESSING APPARATUS, QUALITY REPORT DATA CREATION METHOD, AND MEDIA

CROSS-REFERENCE TO RELATED APPLICATIONS

This application is a Continuation of International Patent Application No. PCT/JP2020/044711, filed Dec. 1, 2020, which claims the benefit of Japanese Patent Application No. 2019-221447, filed Dec. 6, 2019, both of which are hereby incorporated by reference herein in their entirety.

BACKGROUND OF THE INVENTION

Field of the Invention

The present invention relates to a workflow system, an information processing apparatus, a quality report data creation method, and a program.

Background Art

In the commercial printing field, it is assumed that information exchange associated with requests and reports concerning the quality of a product that an orderer requests of a printing company needs to be performed digitally. Examples of specifications for implementing this are standards such as PQX/PRX (Print Quality eXchange, Print Request eXchange), and JDF (Job Definition Format). A series of processes of transmitting, by PRX, a request of quality of a product that an orderer requests of a printing company and reporting, by PQX, the quality of a product produced by the printing company to the orderer is digitized.

Hence, first, request matters concerning the quality of the product, which the orderer conventionally requests of the printing company, are quantitatively presented, thereby obtaining an effect of reducing the possibility that false recognitions concerning the product quality occur on both sides.

Second, since the quality of the product produced by the printing company can digitally be visualized, the orderer can immediately grasp the quality of the product requested to be produced.

Third, as the effect of digitizing requests and reports concerning quality, even if the quality may temporally fluctuate in long-term product production, the orderer and the printing company can easily execute activities to make the quality even.

Fourth, even if the orderer requests a plurality of printing companies to do production, quality variations among the plurality of printing companies can be visualized, and the orderer and the printing companies can easily execute activities to make the quality even.

CITATION LIST

Patent Literature

PTL 1: Japanese Patent Laid-Open No. H04-197751

A product quality request/report system has another problem in providing convenience to a user. More specifically, the following problem exists.

In the proposal of PTL 1, a determination image obtained by reading a print product and a reference image are compared on a pixel basis, and the degree of quality of the print state is ranked based on the number of pixels for which the level difference exceeds an allowable setting value. However, in the conventional technique, since a printing company decides the allowable setting value and the number of pixels, these may not meet orderer's requirements. Also, in the conventional technique, the quality of the print state is determined based on only an image. For this reason, even if the image has high quality, there may be a problem that remarkable misregistration occurs between obverse and reverse surfaces, or a barcode cannot be read, and the print product may be unacceptable for the orderer.

The present invention has been made in consideration of the above-described situation. That is, the above-described problem is solved by returning the determination result of quality of a print product together with measurement data based on the information of a determination method sent from an orderer.

SUMMARY OF THE INVENTION

Hence, the following configuration is proposed. According to an aspect of the present invention, there is provided an information processing apparatus comprising:
 at least one processor; and
 at least one memory in which at least one program is stored, wherein the at least one program causes the at least one processor to perform:
 acquiring an inspection result obtained by inspecting quality of a print product;
 receiving quality request data including an evaluation criterion;
 specifying a quality level of the print product based on the evaluation criterion included in the quality request data and the inspection result;
 creating quality report data including the inspection result and the quality level; and
 transmitting the quality report data to a predetermined external apparatus.

According to another aspect of the present invention, there is provided a workflow system comprising:
 an information processing apparatus;
 an image forming apparatus;
 an inspection apparatus configured to inspect quality of a print product generated by the image forming apparatus, wherein
 the information processing apparatus comprising:
 at least one processor; and
 at least one memory in which at least one program is stored, wherein the at least one program is configured to cause the at least one processor to perform:
 acquiring an inspection result obtained by inspecting quality of a print product;
 receiving quality request data including an evaluation criterion;
 specifying a quality level of the print product based on the evaluation criterion included in the quality request data and the inspection result;
 creating quality report data including the inspection result and the quality level; and
 transmitting the quality report data to a predetermined external apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 4 is a view showing the software configuration of the image forming apparatus according to the first embodiment;

FIG. 5 is a view showing the software configuration of the information processing apparatus of a printing company system according to the first embodiment;

FIG. 6 is a view showing the software configuration of the information processing apparatus of an orderer system according to the first embodiment;

FIG. 7A is a system flowchart for explaining the processing procedure of the entire print processing system according to the first embodiment;

FIG. 7B is a system flowchart for explaining the processing procedure of the entire print processing system according to the first embodiment;

FIG. 10B is a first view for explaining the operation unit of the application system that operates in the information processing apparatus of the orderer system according to the first embodiment;

FIG. 10C is a first view for explaining the operation unit of the application system that operates in the information processing apparatus of the orderer system according to the first embodiment;

FIG. 12A shows an example of data exchanged between the orderer system and the printing company system according to the first embodiment;

FIG. 12B shows an example of data exchanged between the orderer system and the printing company system according to the first embodiment;

FIG. 12C shows an example of data exchanged between the orderer system and the printing company system according to the first embodiment;

FIG. 12D shows an example of data exchanged between the orderer system and the printing company system according to the first embodiment;

FIG. 12E shows an example of data exchanged between the orderer system and the printing company system according to the first embodiment;

FIG. 12F shows an example of data exchanged between the orderer system and the printing company system according to the first embodiment;

FIG. 12G shows an example of data exchanged between the orderer system and the printing company system according to the first embodiment;

FIG. 12H shows an example of data exchanged between the orderer system and the printing company system according to the first embodiment;

FIG. 12I shows an example of data exchanged between the orderer system and the printing company system according to the first embodiment;

FIG. 12J shows an example of data exchanged between the orderer system and the printing company system according to the first embodiment;

FIG. 12K shows an example of data exchanged between the orderer system and the printing company system according to the first embodiment;

FIG. 12L shows an example of data exchanged between the orderer system and the printing company system according to the first embodiment;

FIG. 12M shows an example of data exchanged between the orderer system and the printing company system according to the first embodiment;

FIG. 12N shows an example of data exchanged between the orderer system and the printing company system according to the first embodiment;

FIG. 14A shows an example of the format of quality request data and print quality report data according to the first embodiment;

FIG. 14B shows an example of the format of quality request data and print quality report data according to the first embodiment;

FIG. 14C shows an example of the format of quality request data and print quality report data according to the first embodiment;

FIG. 15A shows an example of print quality report data according to the fifth embodiment;

FIG. 15B shows an example of print quality report data according to the fifth embodiment.

DESCRIPTION OF THE EMBODIMENTS

Figure 1:
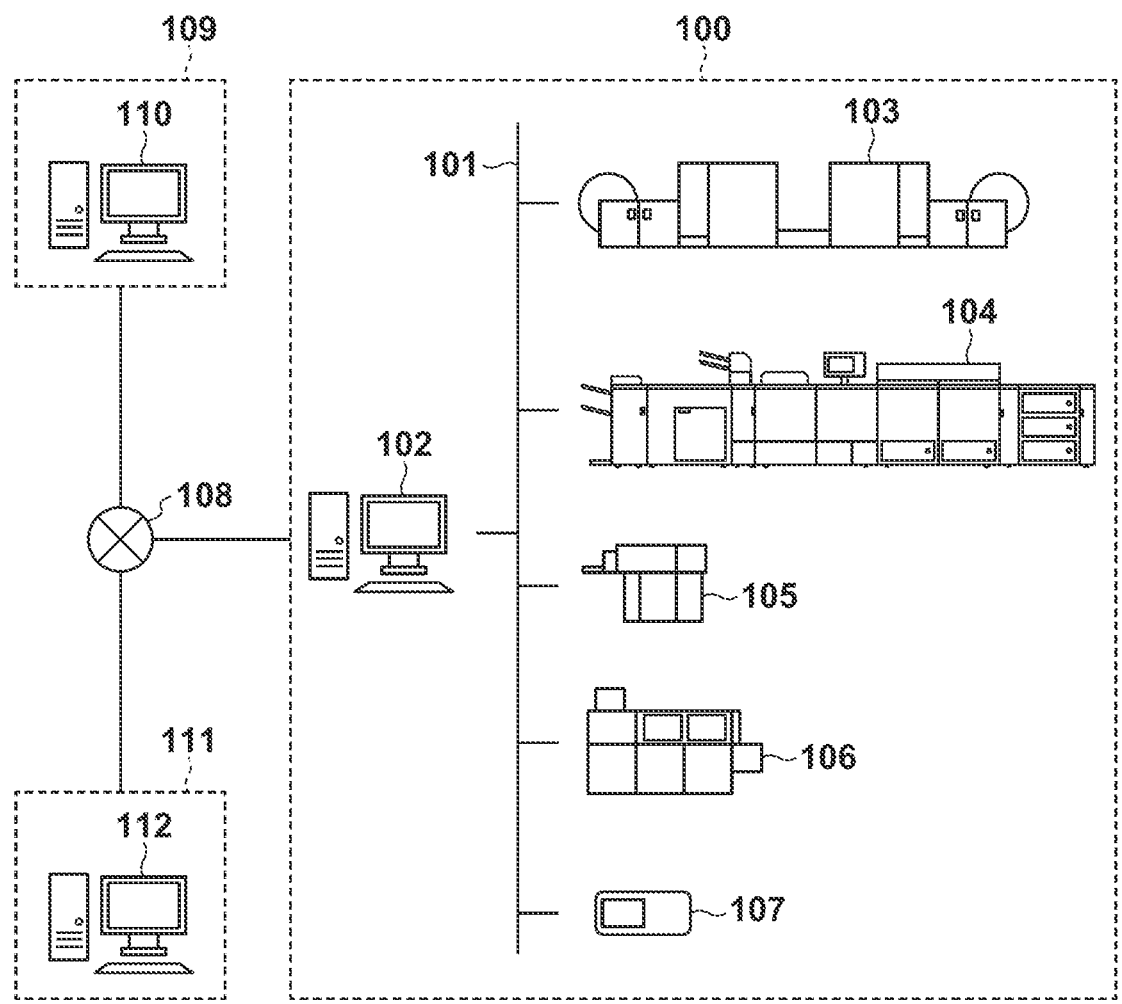
FIG. 1 is a block diagram showing an entire print processing system according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

System Configuration

FIG. 1 is a block diagram showing a print product production system according to this embodiment. In this example, the print product production system is roughly divided into an orderer system 109, a printing company system 100, and a parent company system 111 of the printing company. These are connected to each other by a communication network, for example, the Internet 108. The orderer system 109 includes at least one information processing apparatus 110. Similarly, the parent company system 111 includes at least one information processing apparatus 112. Note that in this embodiment, the parent company system 111 may not be included in the print product production system.

The internal configuration of the printing company system 100 will be described below in detail. As shown in FIG. 1, a plurality of apparatuses are connected to each other by a network 101. In this example, an information processing apparatus 102, an image forming apparatus 103, an image forming apparatus 104, a laminator 105, a perfect binder 106, and a colorimeter 107 are connected. The laminator 105 may be a post-processing apparatus such as a varnish coater. The image forming apparatus 103 is an image forming apparatus for a continuous form sheet (to be also referred to as a roll sheet), and the image forming apparatus 104 is an image forming apparatus for a cut sheet. Using these apparatuses of different print mechanisms, the printing company can produce a product requested by an orderer in an optimum mode. These apparatuses can roughly be classified into an image forming apparatus, a post-processing apparatus, and an inspection apparatus. The image forming apparatus forms an image on a sheet, and the post-processing apparatus performs post-processing for the sheet with the formed image. The inspection apparatus inspects whether image formation or post-processing is performed as requested. The laminator is a post-processing apparatus configured to laminate a sheet with a film. A fluoroscopic image inspection apparatus 115 is an inspection apparatus configured to inspect, for example, the position of a registration mark through a print medium such as a sheet.

The apparatuses are controlled under workflow software operating on the information processing apparatus 102 to process job data submitted from the orderer system 109 and produce a product. That is, the apparatuses constitute a workflow system including submission of data including print instruction data, print data, and a quality evaluation criterion, print processing, post-processing, and inspection. Job data submitted from the orderer system 109 includes image data, a job ticket, and quality request data. The format of the job ticket is, for example, the JDF format, and the format of the quality request data is, for example, the PRX format. The information processing apparatus 102 in the printing company system 100 also has a function of receiving the notifications of the processing results of the above-described apparatuses, converting these into quality report data, and transmitting it to the orderer system 109. The format of the quality report data is, for example, the PQX format.

Note that when a series of processes of transmitting, by PRX, the quality of a product that the orderer requests of the printing company and reporting, by PQX, the quality of a product produced by the printing company to the orderer is digitized, the following advantages can be obtained.

First, request matters concerning the quality of the product, which the orderer conventionally requests of the printing company, are quantitatively presented, thereby obtaining an effect of reducing the possibility that false recognitions concerning the product quality occur on both sides. Second, since the quality of the product produced by the printing company can digitally be visualized, the orderer can immediately grasp the quality of the product requested to be produced. Third, as the effect of digitizing requests and reports concerning quality, even if the quality may temporally fluctuate in long-term product production, the orderer and the printing company can easily execute activities to make the quality even. Fourth, even if the orderer requests a plurality of printing companies to do production, quality variations among the plurality of printing companies can be visualized, and the orderer and the printing companies can easily execute activities to make the quality even.

Hardware

Figure 2:
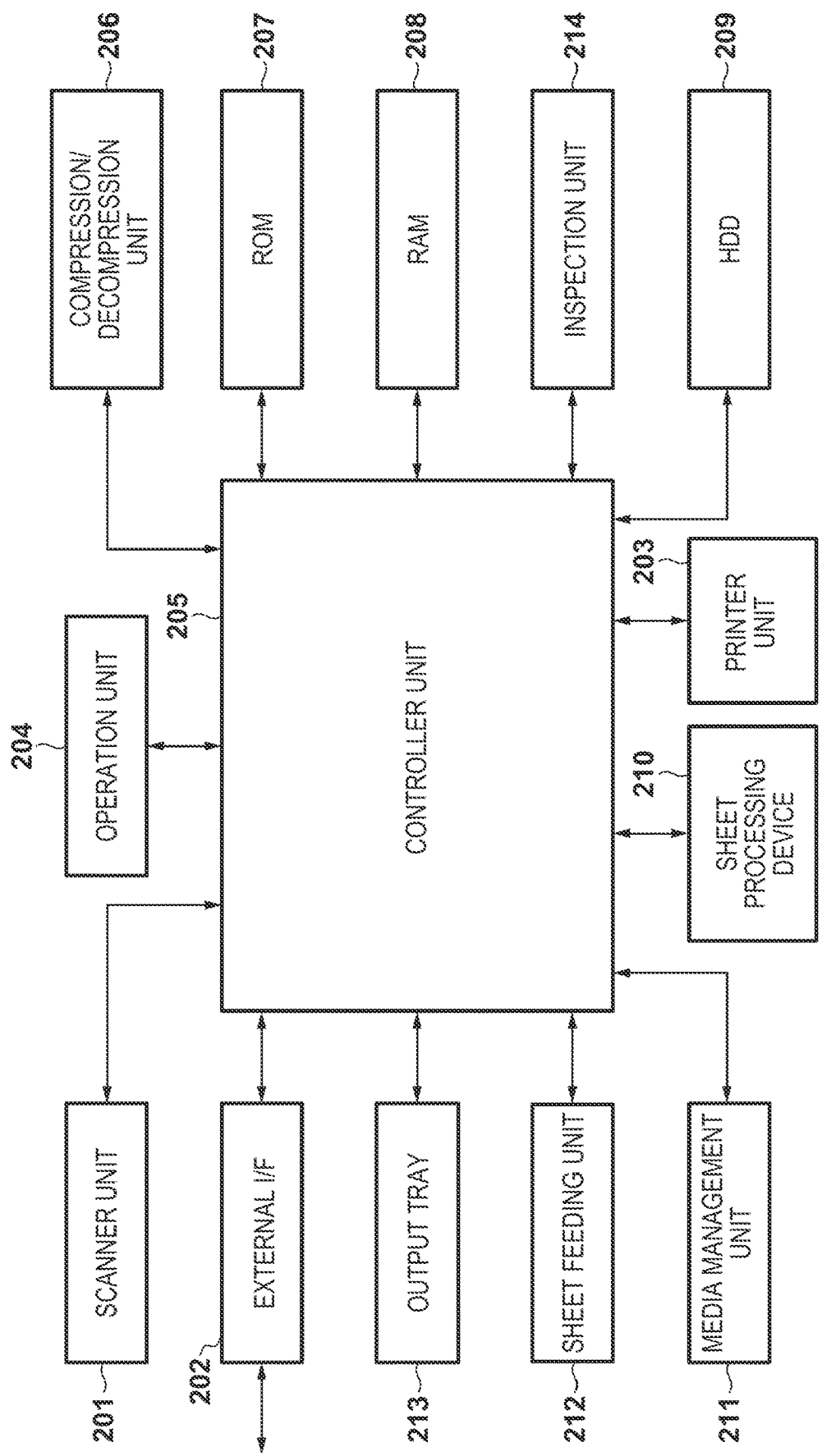
FIG. 2 is a block diagram showing the hardware configuration of an image forming apparatus according to the first embodiment.

FIG. 2 is a block diagram for explaining the hardware configuration of the image forming apparatus 104. The image forming apparatus 104 has a read function of reading an image on a sheet, and a print function of printing an image on a sheet. The image forming apparatus 104 also has a post-processing function of binding a plurality of sheets with printed images, aligning a plurality of sheets, or allocating the discharge destination of a plurality of sheets to a plurality of trays. Note that sheets include a paper sheet such as plain paper or thick paper and a film sheet. The image forming apparatus 104 shown in FIG. 2 is configured to perform complex sheet processing by connecting a plurality of devices of different roles to each other.

The image forming apparatus 104 is an apparatus used to convey a medium stored in a sheet feeding unit 212 and form an image of expanded image data on the medium using toner.

The image forming apparatus 104 includes a scanner unit 201 and an operation unit 204. The operation unit 204 provides various kinds of interfaces in a case in which an operator performs various kinds of settings and operations of the image forming apparatus 104. The image forming apparatus 104 according to this embodiment is configured to attach various kinds of auxiliary devices. In this embodiment, a sheet processing device 210 is shown as an example of the auxiliary device. The sheet processing device 210 is a device configured to obtain a product by performing various kinds of processing for a medium after image formation by a printer unit 203.

An output tray 213 forms a tray portion configured to discharge an output product processed by the sheet processing device 210 and stack.

A hard disk (to be also referred to as an HDD hereinafter) 209 is a nonvolatile memory and stores the data of a plurality of jobs as a processing target and various kinds of management information. In the image forming apparatus 104, job data accepted from the scanner unit 201 is printed by the printer unit 203 via the HDD 209. Also, in the image forming apparatus 104, job data accepted from an external apparatus via an external I/F unit 202 corresponding to a part of a communication unit is printed by the printer unit 203 via the HDD 209. The external I/F unit 202 transmits/receives image data or the like to/from a facsimile apparatus, a network connection apparatus, and an external dedicated apparatus. The operation unit 204 corresponds to a user interface unit and includes a display unit here.

A controller unit 205 (to be also referred to as a control unit or a CPU) generally controls processing and operations of various kinds of units provided in the image forming apparatus 104. A ROM 207 stores various kinds of control programs needed in this embodiment, including programs configured to execute various kinds of processing of flowcharts to be described later. The ROM 207 also stores a display control program configured to cause the display unit of the operation unit 204 to display various kinds of UI screens including a user interface screen (to be referred to as a UI screen hereinafter).

The controller unit 205 reads out the programs from the ROM 207 and executes these, thereby causing the image forming apparatus 104 to execute various kinds of operations to be described in this embodiment. A program configured to execute an operation of interpreting code data that forms print data (a page description language, image data) such as PDF and expanding it into raster image data (bitmap image data) is also stored in the ROM 207. Print data is received from an external apparatus (not shown) via, for example, the external I/F 202. A program configured to interpret and process a print job received from an external apparatus (not shown) via the external I/F 202 is also stored in the ROM. These are processed mainly by software. Details of the various kinds of programs stored in the ROM 207 will be described later.

Also, the HDD 209 (hard disk) is a mass storage device configured to store image data compressed by a compression/decompression unit 206. The HDD 209 is configured to hold a plurality of data such as the print data of a job as a processing target. The controller unit 205 controls such that the data of a job as a processing target input via various kinds of input units such as the scanner unit 201 and the external I/F unit 202 can be printed by the printer unit 203 via the HDD 209. The controller unit 205 also controls such that the data can be transmitted to an external apparatus via the external I/F 202. In this way, the controller unit 205 controls to execute various kinds of output processing of the data of the processing target job stored in the HDD. Furthermore, a file system constructed in the HDD 209 is configured such that the function of file sharing and transmission/reception for an external apparatus can be implemented by the controller unit 205 reading out a program from the ROM 207 and executing it.

The compression/decompression unit 206 performs an operation of compressing/expanding image data and the like stored in a RAM 208 or the HDD 209 by various kinds of compression methods such as JBIG and JPEG. Under the above-described configuration, the controller unit 205 as an example of the control unit provided in the printing system controls the operation of each sheet processing device 210 as well.

A media management unit 211 is a module configured to manage information about media types.

An inspection unit 214 is a module provided to inspect image information formed on a sheet by the printer unit 203. Inspection targets include the print position deviation amount (misregistration amount) of each of CMYK plates, the difference (color difference) between a color of an image formed by combining the CMYK plates and a color defined by print data, and the read accuracy of a barcode portion included in the formed image. General image defects such as a scratch and a flaw on an image are also inspected. Concerning these image defects, the module has a function of optically reading an image on a sheet after image formation and converting this into inspection result data. Under the control of the controller unit 205 that controls the modules of the image forming apparatus 104 shown in FIG. 2, the inspection unit 214 inspects image information formed on a sheet. Inspection result information converted into inspection result data by the module is transmitted to the information processing apparatus 102 via the external I/F 202.

Figure 3:
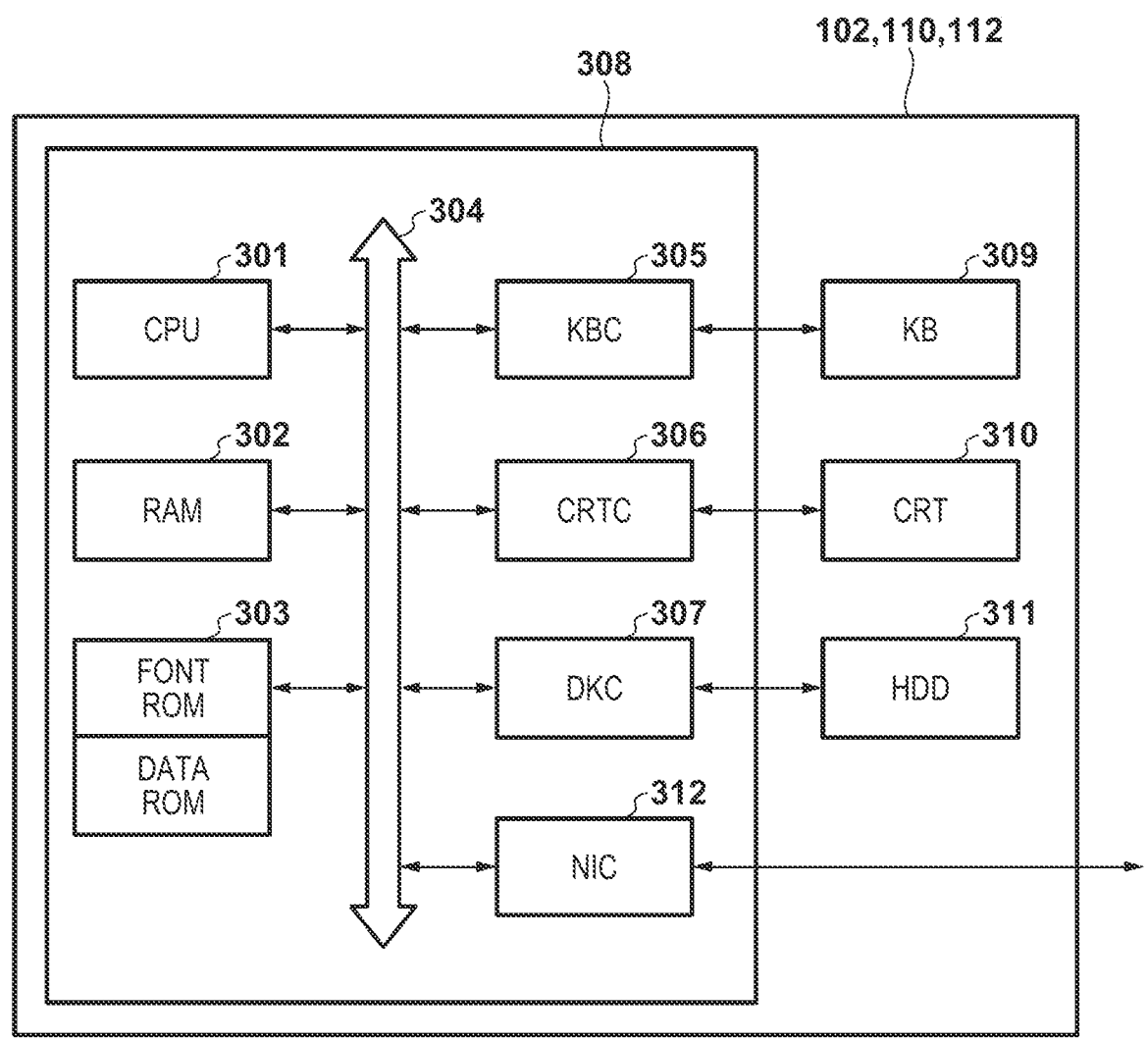
FIG. 3 is a block diagram showing the hardware configuration of an information processing apparatus according to the first embodiment.

FIG. 3 is a block diagram showing the configuration of the information processing apparatuses 102, 110, and 112.

Referring to FIG. 3, a CPU 301 executes the programs of an OS and general applications stored in the program ROM of a ROM 303 or loaded from an HDD 311 to a RAM 302. The ROM 303 also includes a font ROM and a data ROM. The RAM 302 functions as the main memory, work area, and the like of the CPU 301. A keyboard controller (KBC) 305 controls input from a keyboard or a pointing device (not shown). A display controller CRTC 306 controls display on a display unit CRT 310. Note that CRT is an example of a display device, and another display device such as a liquid crystal display device may be used, as a matter of course. A disk controller (DKC) 307 controls access to the HDD 311 and the like, which store a boot program, various kinds of applications, and font data. A network controller (NIC) 312 is connected to a network and executes communication control processing to another apparatus connected to the network. A bus 304 connects the CPU 301, the RAM 302, the ROM 303, and various kinds of controllers, and transports data signals and control signals.

Note that a portable terminal may include, in the configuration, a touch panel controller or the like in place of the keyboard controller (KBC) 305. Also, a mass storage device that replaces the HDD 311 may be provided. Furthermore, the internal configuration of the network controller (NIC) 312 changes between a case in which the apparatus provided with that uses a wired LAN, a case in which the apparatus uses a wireless LAN, and a case in which the apparatus uses both. However, the differences of the internal configuration are hidden in the network controller (NIC) 312, and the system can be controlled by the configuration that is equivalent to the remaining modules shown in FIG. 3.

Software of Image Forming Apparatus

FIG. 4 is a view for explaining the programs of the image forming apparatus 104. These programs are stored in the ROM 207, read out by the controller unit 205 of the image forming apparatus 104, and executed. A boot loader 401 is a program executed immediately after the image forming apparatus 104 is powered on. This program includes a program configured to execute various kinds of activation sequences necessary for activation of the system. An operating system 402 is a program aiming at providing an execution environment for various kinds of programs that implement the functions of the image forming apparatus 104. This mainly provides the function of resource management for the memories of the image forming apparatus 104, that is, the ROM 207, the RAM 208, and the HDD 209, and the function of basic input/output control for the remaining units shown in FIG. 2. A network control program 403 is a program to be executed when data is transmitted/received to/from an apparatus connected via a network. This program is used when executing various kinds of processing such as reception processing of a file to be printed, data transmission from an external apparatus, transmission/reception of a command, and transmission of digital data generated as a result of inspection by the inspection unit 214. The network control program also includes a driver program configured to control the external I/F 202.

A first reception program 404 is a program configured to accept various kinds of instructions and information from the information processing apparatus 102. The information and instructions as the reception target of the program include a designation of image information as the inspection target of the inspection unit 214.

A first transmission program 405 is a program configured to transmit information to the information processing apparatus 102. Information as the transmission target of the program includes inspection result data generated as a result of inspection by the inspection unit 214.

A JDF function program 406 is a program that, if the image forming apparatus 104 receives JDF job data via the external I/F 202, executes a JDF print function executed by the controller unit 205 in accordance with an instruction from the external I/F 202. In the JDF print function, based on a processing order and processing conditions described in the program, the controller unit 205 sequentially instructs the operation of each device shown in FIG. 2 in an appropriate order. Control is done such that JDF print processing is executed finally as the result. The devices include the sheet processing device 210, the printer unit 203, the HDD 209, the compression/expansion unit 206, the RAM 208, and the like. The program also includes analysis processing of JDF job data received via the external I/F 202, discrimination processing of discriminating whether an incorrect setting is included in the JDF as the result of analysis processing, and program processing of performing setting change to eliminate an incorrect setting.

If the image forming apparatus 104 receives PDF data (print target image data) via the external I/F 202, a PDF function program 407 executes expansion processing of the PDF data and the print function, which are executed by the controller unit 205. In the PDF function performed by the controller unit 205, based on a processing order and processing conditions described in the program, the controller unit 205 sequentially instructs the operation of each device shown in FIG. 2 in an appropriate order. As a result, execution of PDF print processing is finally controlled. The devices include the sheet processing device 210, the printer unit 203, the HDD 209, the compression/expansion unit 206, the RAM 208, and the like. The PDF program according to this embodiment is configured to operate together with a JDF function program 406 as various kinds of designations at the time of execution of print processing.

A media management program 408 is a program configured to execute a management function associated with sheets usable by the image forming apparatus 104. Sheet associated information managed by the program is stored in the HDD 209.

A sheet count program 409 is a program configured to integrate, manage, and store the number of sheets used for printing when the printer unit 203 forms an image on a sheet stored in the sheet feeding unit 212 provided in the image forming apparatus 104 in linkage with the size information of the sheets.

An inspection program 410 is a program configured to control the inspection unit 214, inspect the image of an output result, and generate inspection result data. Inspection result data generated by the program is transmitted to the information processing apparatus 102 by the first transmission program 405.

Software of Information Processing Apparatus in Printing Company System 100

FIG. 5 is a view showing the configuration of programs held by the information processing apparatus 102 in the printing company system 100. A boot loader 501 is a program executed immediately after the information processing apparatus 102 is powered on. These programs include a program configured to execute various kinds of activation sequences necessary for activation of the system.

An operating system 502 is a program aiming at providing an execution environment for various kinds of programs that implement the functions of the information processing apparatus 102. This provides the function of resource management for the memories of the information processing apparatus, that is, the ROM 303, the RAM 302, and the HDD 311.

A network control program 503 is a program to be executed when data is transmitted/received to/from an apparatus connected via a network. That is, the program is used when transmitting print job data to the image forming apparatus (103, 104) and instructing print processing. The program is also used when instructing the laminator 105 to perform decoration processing for a product after printing. The program is also used when instructing the perfect binder 106 to post-process a product. The program is also used when sending an inspection instruction to the inspection unit 214 of the image forming apparatus (103, 104) via the first reception program. The program is also used when receiving quality report data from the inspection unit 214 via the first transmission program 405

A web server 504 is a server program configured to cause an external apparatus connected via a network to use a web service. Various services can be provided by the web server 504. In this embodiment, however, the web server 504 is used to submit data as an order target from the orderer system 109 to the printing company system 100. The web server 504 is also used to acquire PQX information that is a quality report used to confirm whether a quality request set by the orderer for the printing company at the time of document submission is achieved.

A workflow control program 505 is a program configured to intensively manage processing, control, and job execution between apparatuses connected via the network 101 in the printing company system 100, and serves as the core of the printing company system 100. When manufacturing a product using a plurality of steps, that is, a plurality of apparatuses, the workflow control program 505 controls the execution order of the steps and execution of jobs. Also, selection and switching of apparatuses to be used, recovery production, and the like are also controlled by the workflow control program 505. Processing of giving various kinds of instructions to an operator working in the printing company system 100 is also executed by the workflow control program 505. Furthermore, in this example, the workflow control program 505 provides a PQX creation function of receiving measurement data concerning the quality of a printed image from the inspection unit 214 of the image forming apparatus 104 and converting it into the PQX format.

A document submission system program 506 is software that mainly plays a role for holding and managing, in the printing company system 100, data of a production request from the orderer system 109. The document submission system program 506 is also used to digitally execute various kinds of functions necessary for order placement/order reception associated works between the orderer system 109 and the printing company system 100 in cooperation with the web server 504. The various kinds of functions necessary for order placement/order reception associated works include, for example, a series of processes such as data transmission and issuance of an invoice. Arbitrary communication specifications can be used between the orderer system 109 and the printing company system 100, and a system that supports PrintTalk as standard specifications is widely known.

A second reception program 507 is a program provided for the purpose of receiving PRX that is quality request data in data submitted from the orderer system 109. Hence, this program is also called a quality request reception program. When the program receives PRX, that is, quality request data, the contents are analyzed. According to the analysis result, instructions/conditions needed to create a product of quality requested by the orderer are appropriately set for the apparatuses in the printing company system 100 via the workflow control program 505. Alternatively, necessary information is presented to the operator via the printing company system 100.

Note that in this embodiment, when the printing company system 100 receives quality request data from the orderer system 109, the reception is done via the web server 504. In the printing company system 100, the received quality request data is further received by the second reception program 507. However, this is merely an example, and this form need not always be employed. That is, as another form, the second reception program 507 itself may directly receive the quality request data from the orderer system 109. Alternatively, a form in which the second reception program 507 operates as a web content on the web server 504 may be employed.

A second transmission program 508 is a program configured to transmit PQX to the orderer system 109. PQX is quality report data used to discriminate whether a quality condition designated in PRX that is quality request data is executed by the printing company at the time of production. Inspection result data is received from the image forming apparatus 103 or 104 or an apparatus in the printing company and accumulated. At an appropriate timing, data in the PQX format, that is, a quality report is created (or converted) from the inspection result data. The second transmission program 508 is configured to transmit this to the orderer system 109 via a communication means such that the orderer system 109 can receive the PQX.

In this embodiment, when the orderer system 109 receives quality report data from the printing company system 100, a request is received via the web server 504. As a response to the received request, quality report data is transmitted via the second transmission program. However, as another form, the second transmission program itself may directly transmit the quality report data to the orderer system 109. Alternatively, a form in which the second transmission program 508 operates as a web content on the web server 504 may be employed.

Software of Information Processing Apparatus in Orderer System 109

FIG. 6 is a view showing the configuration of programs held by the information processing apparatus 110 in the orderer system 109. A boot loader 601 is a program executed immediately after the information processing apparatus 110 is powered on. These programs include a program configured to execute various kinds of activation sequences necessary for activation of the system. An operating system 602 is a program aiming at providing an execution environment for various kinds of programs that implement the functions of the information processing apparatus 110. This provides the function of resource management for the memories of the information processing apparatus, that is, the ROM 303, the RAM 302, and the HDD 311. A network control program 603 is a program to be executed when data is transmitted/received to/from an apparatus connected via a network. That is, the program is used when executing data transmission/reception to/from the printing company system 100 via the Internet 108. The program is also used in drawing display processing and data transmission/reception processing using a web browser to be described later.

A web browser 604 is a client program configured to use a web service provided by an external system connected via the network. The web browser 604 can use various services. In this embodiment, the web browser 604 is used to make a data submission request as an order placement target for the printing company system 100. Also, a quality report (PQX information) used to confirm whether a quality request set by the orderer for the printing company at the time of document submission is achieved is acquired by the web browser 604.

A PDF creation program 605 is a program configured to create image data in a PDF format, which is the target of a production request from the orderer system 109 to the printing company system 100. Note that in this embodiment, an example in which the PDF format is used as the format of image data is shown. However, another format may be used. Note that PDF data creation also includes processing of adding an image to already existing image data in the PDF format.

A PRX creation program 606 is a program configured to create information for transmitting quality request matters of a product to be generated in the PRX format when the orderer system 109 requests the printing company system 100 to do production. Detailed contents of the quality request designated by the program, a setting method therefor, and a created data format will be described later.

A JDF (or job instruction) creation program 607 is a program configured to create a job instruction when the orderer system 109 requests the printing company system 100 to do production. The job instruction includes information for transmitting, by the JDF format, the form of the product to be produced, job execution conditions at the time of production, job settings, and the like. Detailed contents of setting information and the like designated by the program, a setting method therefor, and a created data format will be described later.

A third transmission program 608 is a program used to transmit quality request data in the PRX format created by the PRX creation program 606 from the orderer system 109 to the printing company system 100.

A third reception program 609 is a program used by the orderer system 109 to receive, from the printing company system 100, quality report data created by the second transmission program 508 in the printing company system 100. The quality report data has, for example, a PQX format.

Production Procedure of Print Product

FIGS. 7A and 7B are system flowcharts when the orderer system 109, the printing company system 100, and the orderer, that is, the user who is the operator use the functions provided by the system. A user 701 indicates the user of the information processing apparatus 110 in the orderer system 109. Since FIG. 7B shows the continuation of processing shown in FIG. 7A, FIGS. 7A and 7B will sometimes be referred to as FIG. 7 altogether in the following explanation. Note that "job setting registration" at the end of FIG. 7A and "job setting registration" at the start of FIG. 7B indicate the same step.

Systems and Subsystems Configured to Execute Production Procedure of Print Product The procedure of processing to be executed in the system of each of the user 701, the information processing apparatuses 110 and 102, and the image forming apparatus 104 and message (or data) exchange between the modules in the systems is shown below. However, if a plurality of subsystems need to perform processing while interacting each other in each system, the procedure will be described in the level of the subsystems.

The subsystem of the user 701 is a user operation 702. This is a subsystem used by the user to implement a series of procedures shown in FIGS. 7A and 7B and associated with inputs to user interfaces provided by programs and outputs from programs. The user operation subsystem 702 includes user interfaces provided by the web browser 604, the PDF creation program 605, the PRX creation program 606, the JDF creation program 607, and the like, which correspond to the operation unit 204.

The information processing apparatus 110 of the orderer system 109 is decomposed into two subsystems. That is, these are a data creation application unit 703 and a web browser unit 704.

The data creation application unit 703 is implemented by the CPU 301 executing the PDF creation program 605, the PRX creation program 606, and the JDF creation program 607. The web browser unit 704 is implemented by the CPU 301 executing the web browser 604.

The information processing apparatus 102 of the information processing apparatus 110 is decomposed into three subsystems. That is, these are a web server unit 705, a document submission system unit 706, and a workflow control unit 707.

The web server unit 705 is implemented by the CPU 301 executing the web server 504. The document submission system unit 706 is implemented by the CPU 301 executing the document submission system program 506. The workflow control unit 707 is implemented by the CPU 301 executing the workflow control program 505.

Note that in the following description, a processing step indicates a step associated with processing such as print processing or post-processing, and will sometimes simply be referred to as a step. Also, an inspection step indicates a step of inspecting quality of an intermediate product or a final product of a print product, and will sometimes simply be referred to as inspection. A workflow indicates a flow of sequentially or parallelly ordered in which the processing step and the inspection step are arranged such that the product of the preceding step becomes the target of a work or inspection. The workflow is sometimes called a work step. The workflow is defined by workflow information. The workflow information may be information that designates, for example, apparatuses for executing the processing step and the inspection step and the order of the processing step and the inspection step.

Details of Production Procedure of Print Product
<Creation of Various Kinds of Data>

In step S709, the user 701 instructs creation of data as the target of order placement to the printing company 100. A print product production processing sequence starts here. Upon receiving an operation by the instruction of the step, the PDF creation program 605 executes various kinds of processing for creating desired PDF image data (step S710). Note that in FIG. 7A, S710 indicates an arrow, and this represents that the process advances to step S711 next to the processing of step S710. This also applies to the remaining steps.

After creation of desired PDF image data is completed in step S710, in step S711, the user further instructs creation of quality request data for the product of order placement to the printing company 100. Upon receiving an operation by the instruction of the step, the PRX creation program 606 executes various kinds of processing for creating desired PRX data (quality request data) (step S712). The requested quality includes, for example, tint accuracy (tint), position accuracy (misregistration), image distortion, barcode readability, and correctness of a text.

After the work of creating desired PRX data is completed in step S712, in step S713, the user further instructs creation of a job ticket for the product of order placement to the printing company 100. Upon receiving an operation by the instruction of the step, the JDF creation program 607 executes various kinds of processing for creating desired JDF data (job instruction data) (step S714). In this example, for example, the job instruction data may include instructions of steps to be performed in post-processing in addition to a print step. For example, the job instruction may include instructions of processing steps such as binding, cutting, bookbinding, coating, and laminating. The instruction of each processing step may include parameters unique to the step. For example, in cutting, the designation and size of a side to be cut may be included. In bookbinding, the number of sheets may be included.

When creation of desired JDF data is completed in step S714, creation of all data to be submitted to the printing company is completed. From the next, step, the process advances to data submission processing to the printing company.

<Document Submission Processing>

In step S715, the user operates the web browser unit 704 and performs an operation necessary for displaying an operation screen used to submit data to the printing company. That is, based on URL information input in step S715, in step S716, the web browser unit 704 outputs an http request necessary for drawing processing to the web server unit 705 operating in the information processing apparatus 102 on the printing company side. Upon receiving the request, in step S717, the web server unit 705 returns corresponding page information as a response. Although not illustrated, the response is received by the browser application unit 704 and displayed.

In step S718, the user operates the displayed document submission screen and instructs execution of order placement processing on the web browser unit 704.

Upon receiving the instruction of step S718, in step S719, the web browser unit 704 transmits PDF, PRX, and JDF data, that is, submission data to the web server unit 705. Upon receiving the submission data, in step S720, the web server unit 705 executes processing of storing the submission data in the document submission system unit 706.

<Production Processing>

From step S721, steps of production processing of executing submitted data in the printing company system 100 are performed. That is, job data is registered in the workflow control unit 707 based on the submission data, and a print job is generated in the printing company system 100. Also, in the system according to this embodiment, it is necessary to evaluate the quality of a product and create and transmit PQX that is a quality report representing whether the designated PRX is satisfied. Hence, after job registration processing is ended in step S722, the document submission system unit 706 instructs the workflow control unit 707 to create PQX (step S723).

When the step is ended, preparation for production start is completed (step S724). Hence, in step S724, the workflow control unit 707 notifies the document submission system 706 of the completion of quality request setting. In response to this, the document submission system 706 instructs the workflow control unit 707 to start production, that is, perform job execution processing (step S725). The workflow control unit 707 generates a print job to the print control unit 708 as a constituent element of the image forming apparatus 104 (step S726). The print job includes print data, parameters to be used by the print control unit 708 in printing, and parameters to be used for quality measurement such as a colorimetric position.

Upon receiving the production instruction of step S726, the print control unit 708 starts print processing. In step S727, the inspection unit 214 provided in the image forming apparatus 104 executes inspection for the produced product. In step S728, the inspection unit 214 returns the inspection result to the workflow control unit 707. The workflow control unit 707 converts the returned inspection result data into the PQX format and stores it in the web server unit 705 (step S729).

A series of operation procedures concerning production of data submitted from the orderer system 109 by the printing company system 100 and creation processing of PQX that is requested quality report information has been described above.

<Quality Report Processing>

In step S730, the user executes PQX data acquisition processing to confirm the quality state at the time of production of the submitted data. That is, the user accesses the web browser unit 704 and inputs information such as a URL necessary for acquiring PQX information. In step S731, the http request is transmitted from the web browser unit 704 to the web server unit 705. In step S732, corresponding response information is returned in step S732. In step S733, the user operates a web screen returned in step S732 and instructs the web browser unit 704 to acquire quality report information, that is, PQX. In accordance with the instruction, an http request is transmitted to the web server unit 705 (step S734), and PQX information is transmitted to the user as the response of the step (step S735).

Functional Module Diagram

Figure 8A:
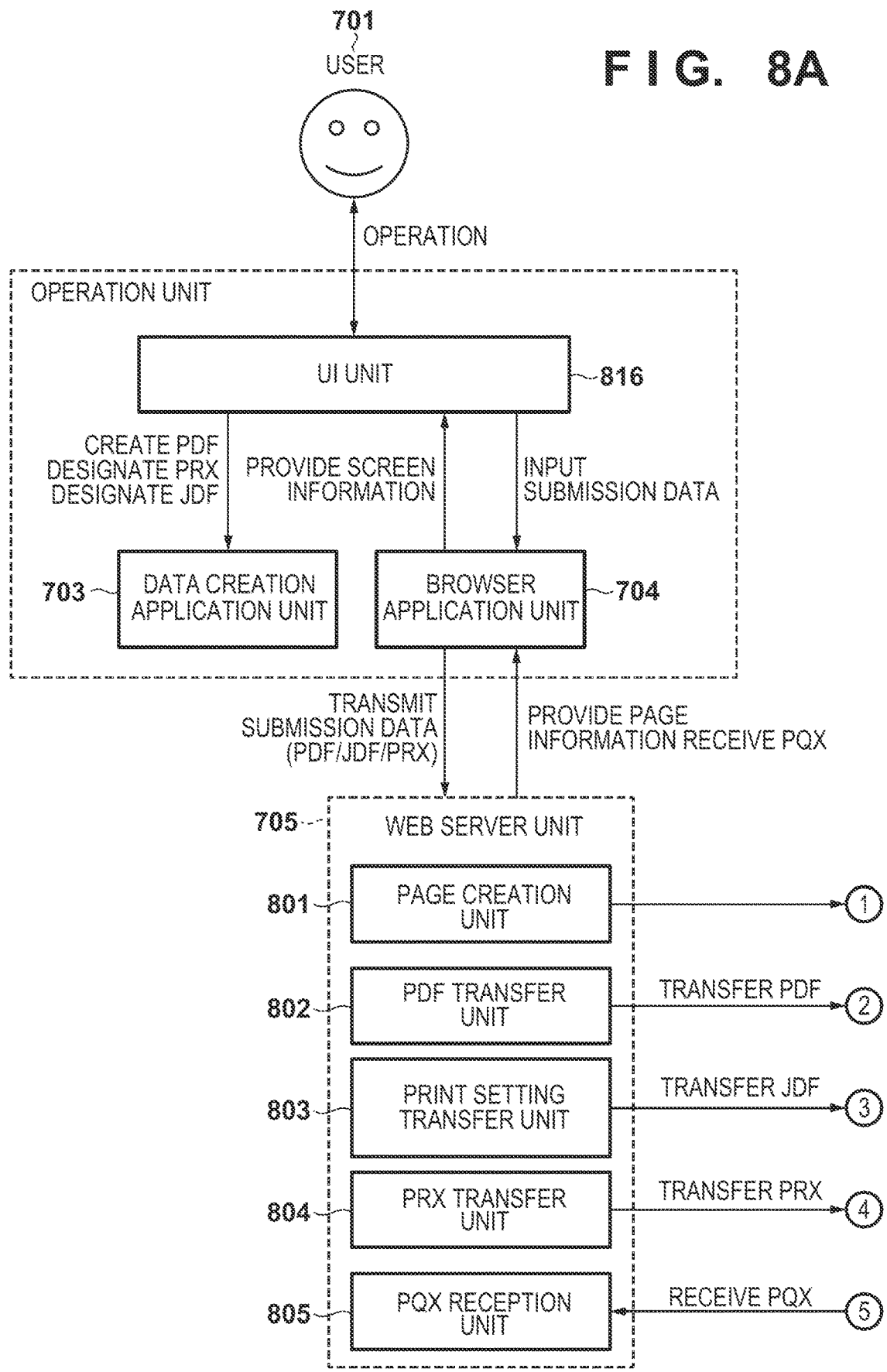
FIG. 8A is a detailed block diagram for explaining details of the system configuration of the entire print processing system according to the first embodiment.
Figure 8B:
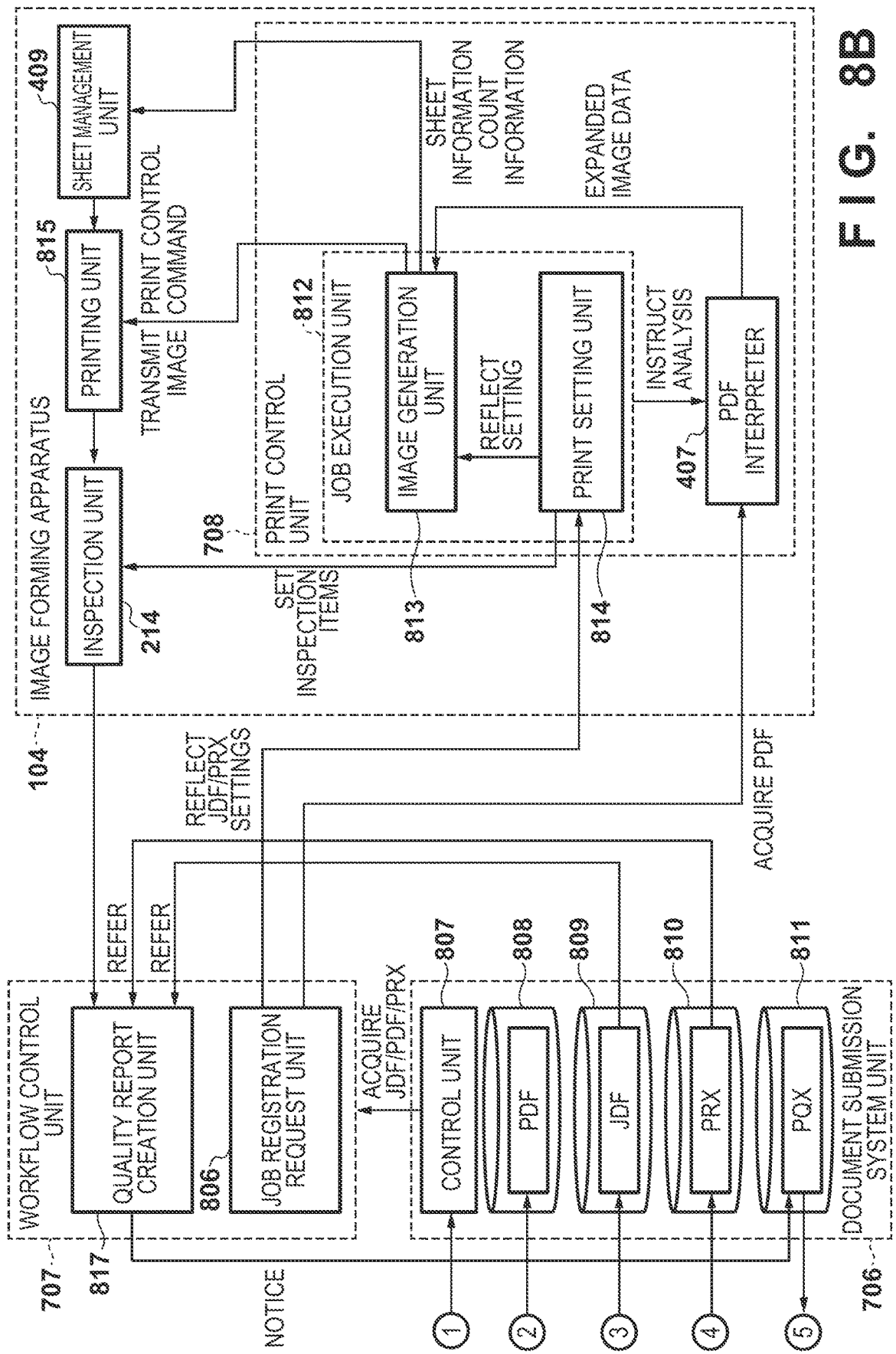
FIG. 8B is a detailed block diagram for explaining details of the system configuration of the entire print processing system according to the first embodiment.

FIGS. 8A and 8B are system diagrams showing processes allocated to the functional modules formed by the orderer system 109 and the printing company system 100, which form the system, and the user who is the operator thereof and association between the functions. Details of each unit will be described below. Note that FIGS. 8A and 8B are continuous drawings and will sometimes be referred to as FIG. 8 altogether.

Referring to FIG. 8A, a user interface (UI) unit 816 is a functional unit provided to provide a means for accepting display of image information, a data input/output instruction, and an operation instruction. Instructions are input from the UI unit 816 to the data creation application unit 703 and the browser application unit 704.

The data creation application unit 703 provides a function of creating JDF, PDF, and PRX data to the user.

The browser application unit 704 is a functional unit configured to present screen information by displaying web contents on a window screen displayed on the UI unit 816. The browser application unit 704 performs transmission/reception processing of information to/from the web server unit 705 to be described later, thereby executing various kinds of processing including presentation of various kinds of screen information and print target data transfer. Thus, the browser application unit 704 can provide, to the user, a series of functions of document submission and quality request/report between the orderer system 109 and the printing company system 100.

The web server unit 705 is a functional unit held by the information processing apparatus 102 in the printing company system 100 and configured to provide a web service to an external apparatus. The web server unit 705 executes a series of processes of receiving various kinds of requests, that is, requests from an external apparatus and returning a result of executing processing according to the contents to the outside in a form of page information. A page creation unit 801 plays a role of generating page information in accordance with the contents of a request. The page creation unit 801 can also issue a document submission processing execution instruction to a control unit 807 of the document submission system unit 706.

A PDF transfer unit 802, a print setting transfer unit 803, and a PRX transfer unit 804 transfer PDF, JDF, and PRX, which are the submission data transmitted from the browser application unit 704, to storage means (808, 809, and 810) provided in the document submission system unit 706, respectively. In addition, a PQX reception unit 805 executes processing of receiving PQX data 811 created by a quality report creation unit 817 to be described later.

Referring to FIG. 8B, the document submission system unit 706 is a functional unit held by the information processing apparatus 102 in the printing company system 100 and configured to provide a service associated with document submission processing to an external apparatus. The control unit 807 requests submitted data (the PDF 808, the JDF 809, and the PRX 810) of a job registration request unit 806 included in the workflow control unit 707 and instructs the image forming apparatus 104 to execute a print job. The document submission system unit 706 stores the PDF (print data) 808, the JDF (job instruction) 809, and the PRX (quality request) 810 received from the PDF transfer unit 802, the print setting transfer unit 803, and the PRX transfer unit 804. Also, the document submission system unit 706 stores the PQX (quality report) 811 created by the quality report creation unit 817.

The workflow control unit 707 is a functional unit held by the information processing apparatus 102 in the printing company system 100 and configured to provide a workflow function. Under the control of the workflow control unit 707, various kinds of apparatuses shown in FIG. 1 are connected via the network 101. Under the control of the workflow control unit 707, the operations of the apparatuses, a job execution instruction, and the like are performed, and the printing company system 100 operates as a whole. The workflow control unit 707 includes the job registration request unit 806 configured to manage a job that operates on each apparatus in the printing company system 100, and the quality report creation unit 817. The quality report creation unit 508 generates PQX data that is quality report information based on information concerning the quality of a produced product in the result of executing the job operating on each apparatus in the printing company system.

The image forming apparatus 104 is roughly divided into the print control unit 708, the sheet management unit 409, a printing unit 815, and the inspection unit 214.

The print control unit 708 further includes a job execution unit 812 and a PDF interpreter unit 407. The job execution unit 812 includes an image generation unit 813 and a print setting unit 814. The print setting unit 814 receives job data, that is, the JDF 809, the PDF 808, and the PRX 810 transmitted from the job registration request unit 806 and instructs the image generation unit 813 to perform image generation processing. The print setting unit 814 also instructs the PDF interpreter 407 to do analysis processing of the received PDF 808. In addition, the print setting unit 814 instructs the inspection unit 214 to execute inspection for the quality request items of the PRX 810 requested for the generated product. The PDF interpreter 407 transmits intermediate data (not shown) generated after the analysis to the image generation unit 813 and executes subsequent image formation processing. That is, the sheet management unit 409 instructs the size of sheets to be used in print processing and a count specific to the type, and the printing unit 815 executes processing of forming, on a sheet, the image of the intermediate data (not shown) generated after the analysis. Also, the inspection unit 214 executes inspection processing of the image on the sheet generated by the printing unit 815, and registers the result in the quality report creation unit 817.

Configuration of Image Forming Apparatus

Figure 9A:
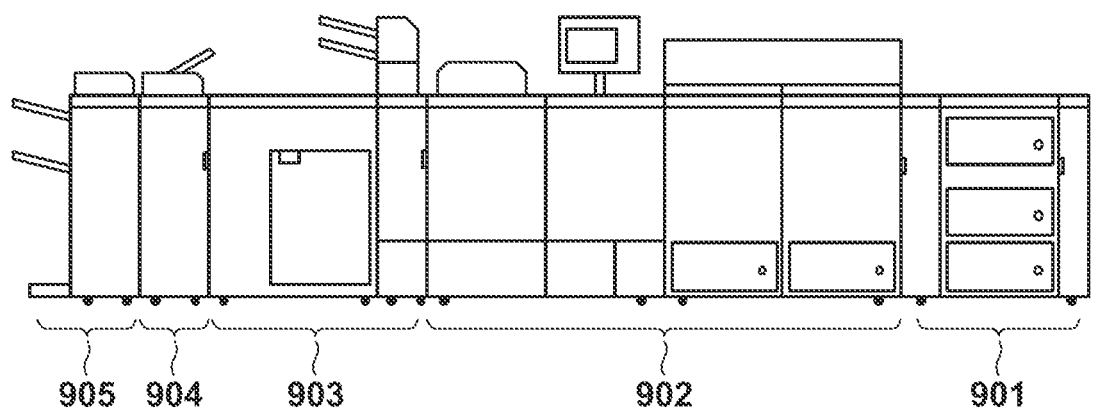
FIG. 9A is a view for explaining the configuration and the operation mechanism of the inspection apparatus of the image forming apparatus according to the first embodiment.
Figure 9B:
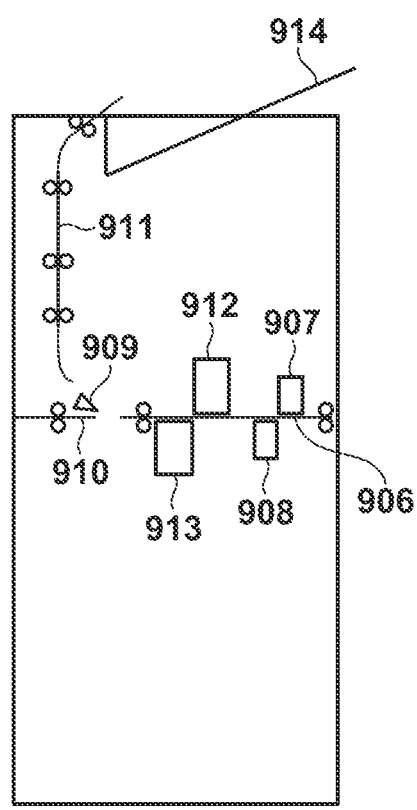
FIG. 9B is a view for explaining the configuration and the operation mechanism of the inspection apparatus of the image forming apparatus according to the first embodiment.
Figure 9C:
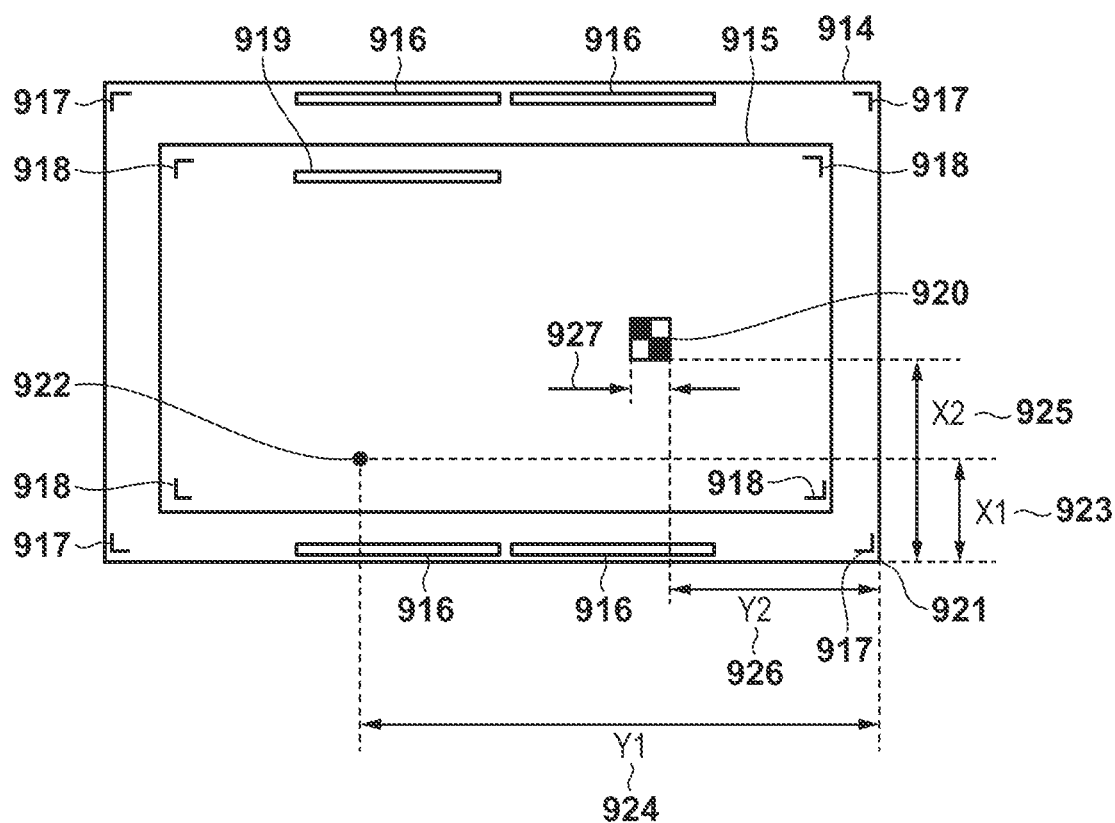
FIG. 9C is a view for explaining the configuration and the operation mechanism of the inspection apparatus of the image forming apparatus according to the first embodiment.

FIGS. 9A to 9C are views for explaining, of the configuration of the image forming apparatus 104, the configuration of the inspection apparatus and the method and mechanism of inspection performed by the inspection apparatus.

FIG. 9A is a view for explaining the arrangement of modules forming the image forming apparatus 104 and the connection state between these, and the order relationship of the conveyance path of a sheet. A sheet feeding unit 901 is attached adjacent to an image forming unit 902. Also, an intermediate processing unit 903 is connected adjacent on the opposite side of the sheet feeding unit 901. The intermediate processing unit 903 corresponds to, for example, an inserter used to insert insertion paper to a specific point of a product under production or a cooling device configured to remove heat generated on a sheet when fixing processing is performed in the image forming unit. An inspection unit 904 is attached to the subsequent stage of the intermediate processing unit 903. Details of the configuration of the inspection unit 904 will be described later.

A post-processing unit 905 is further attached to the rear end of the inspection unit 904. In the post-processing unit 905, processing for a sheet after printing, for example, binding processing such as stapling or punching processing such as punching is performed.

Note that FIG. 9A shows a mere example of the types, number, and connection order of the constituent apparatuses of the image forming apparatus 104, and the present invention is not limited to the example shown in FIG. 9A.

FIG. 9B is a view showing the internal configuration of the inspection unit 904. A printed sheet is conveyed from a device corresponding to the preceding stage of the inspection unit 904 to a conveyance path 906. A first inspection unit 907 and a second inspection unit 908, which are configured to inspect image information formed on the conveyed sheet, are arranged on the upper and lower sides of the sheet, respectively. This is a configuration for simultaneously inspecting images formed on the obverse and reverse surfaces of the sheet. The first inspection unit 907 and the second inspection unit 908 according to this embodiment are formed by contact image sensors arranged parallelly in the main scanning direction with respect to the sheet conveyed to the conveyance path 906. That is, the first inspection unit 907 and the second inspection unit 908, which are formed by contact image sensors, continuously read the images on the sheet conveyed to the conveyance path 906 in the main scanning direction in accordance with the conveyance speed of the sheet. It is therefore possible to accurately acquire the planar image information formed on a sheet. That is, the first inspection unit 907 and the second inspection unit 908 can detect an image defect such as an image position deviation or a blot in the image information formed on the sheet and inspect the barcode read system in the image.

On the conveyance path 906, a third inspection unit 912 and a fourth inspection unit 913 are further arranged at the subsequent stages of the first inspection unit 907 and the second inspection unit 908. The third inspection unit 912 and the fourth inspection unit 913 are spectral colorimetric devices. Like the first inspection unit 907 and the second inspection unit 908, the third inspection unit 912 and the fourth inspection unit 913 are arranged on the upper and lower sides of the conveyance path 906, respectively, to simultaneously inspect the obverse and reverse surfaces of the sheet. Each of the third inspection unit 912 and the fourth inspection unit 913 aims at correctly inspecting the color information at a specific point of the image on a sheet conveyed to the conveyance path 906.

The sheet that has passed through the first to fourth inspection units 907, 908, 912, and 913 is further conveyed in one of two directions depending on the arrangement state of a flapper 909. First, the flapper 909 is controlled such that the sheet is conveyed, via a conveyance path 910, to the post-processing unit 905 corresponding to the rear end of the inspection unit 904. Second, the arrangement state of the flapper 909 is controlled such that the sheet is conveyed to a conveyance path 911 and guided to a discharge tray 914. The inspection unit 904 can perform such control. This is because if the conveyed sheet is not a part of the product but an incidental test print sheet aiming at confirming the tint or image state, it is not the best way to mix the sheet in the product.

FIG. 9C is a view for explaining an example of image information on a sheet used for inspection performed by the first to fourth inspection units (907, 908, 912, and 913) provided in the inspection unit 904. The purpose and object of each image element formed on a sheet 914 will be described below.

A registration mark 917 is a marker used to inspect whether an image is correctly formed at a designated position on the sheet. This image information is read by the first inspection unit 907 and the second inspection unit 908. Even if the registration marks 917 of PRX are not included as image information 915 of the PDF data submitted to the image forming apparatus 104, the image forming apparatus 104 can form the image superimposed on the PDF data. Alternatively, in some cases, these are included in advance as image information in the submitted PDF data, like second registration marks 918. In this case, the first inspection unit 907 and the second inspection unit 908 can read the registration marks 918 included in the PDF data.

A color patch 916 is a patch image portion used to accurately read the color information of the image at a designated position on the sheet by the third inspection unit 912 and the fourth inspection unit 913. Like the registration marks 917, even if the color patches 916 of PRX are not included as the image information 915 of the PDF data submitted to the image forming apparatus 104, the image forming apparatus 104 can form the image superimposed on the PDF data. Alternatively, in some cases, these are included in advance as image information in the submitted PDF data, like second color patches 919. In this case, the third inspection unit 912 and the fourth inspection unit 913 can read the color patches 919 included in the PDF data.

A barcode 920 indicates a region where a barcode image that forms a part of the image of the product is printed. As shown in FIG. 9C, the position of the barcode is designated by relative coordinates (X2 (925), Y2 (926)) designated from origin coordinates 921 of the sheet and a size 927 of the image. Hence, the first inspection unit 907 or the second inspection unit 908 can read and inspect the image information of the barcode 920 by the contact image sensor.

An image defect 922 indicates a defective image portion that is not included in the image information 915 of the submitted PDF data but is formed by the image forming apparatus 104 or a defect in the sheet. The image defect 922 can also be detected by the first inspection unit 907 and the second inspection unit 908, and the position of the detected defect can be acquired as relative coordinates (X1 (923), Y1 (924)) from the origin 921.

User Interface for Submission Data Creation

Figure 10A:
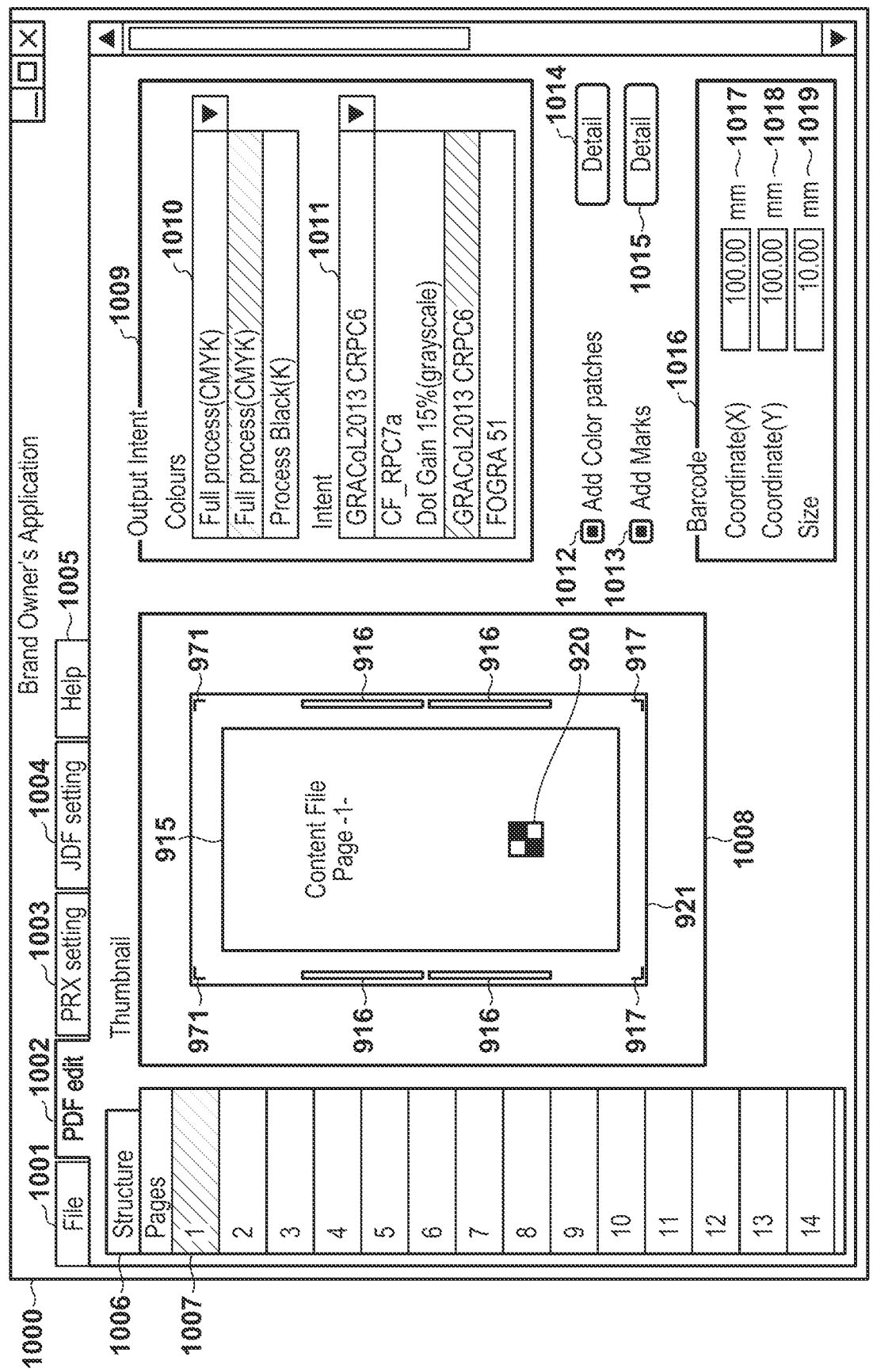
FIG. 10A is a first view for explaining the operation unit of an application system that operates in the information processing apparatus of the orderer system according to the first embodiment.
Figure 10B:
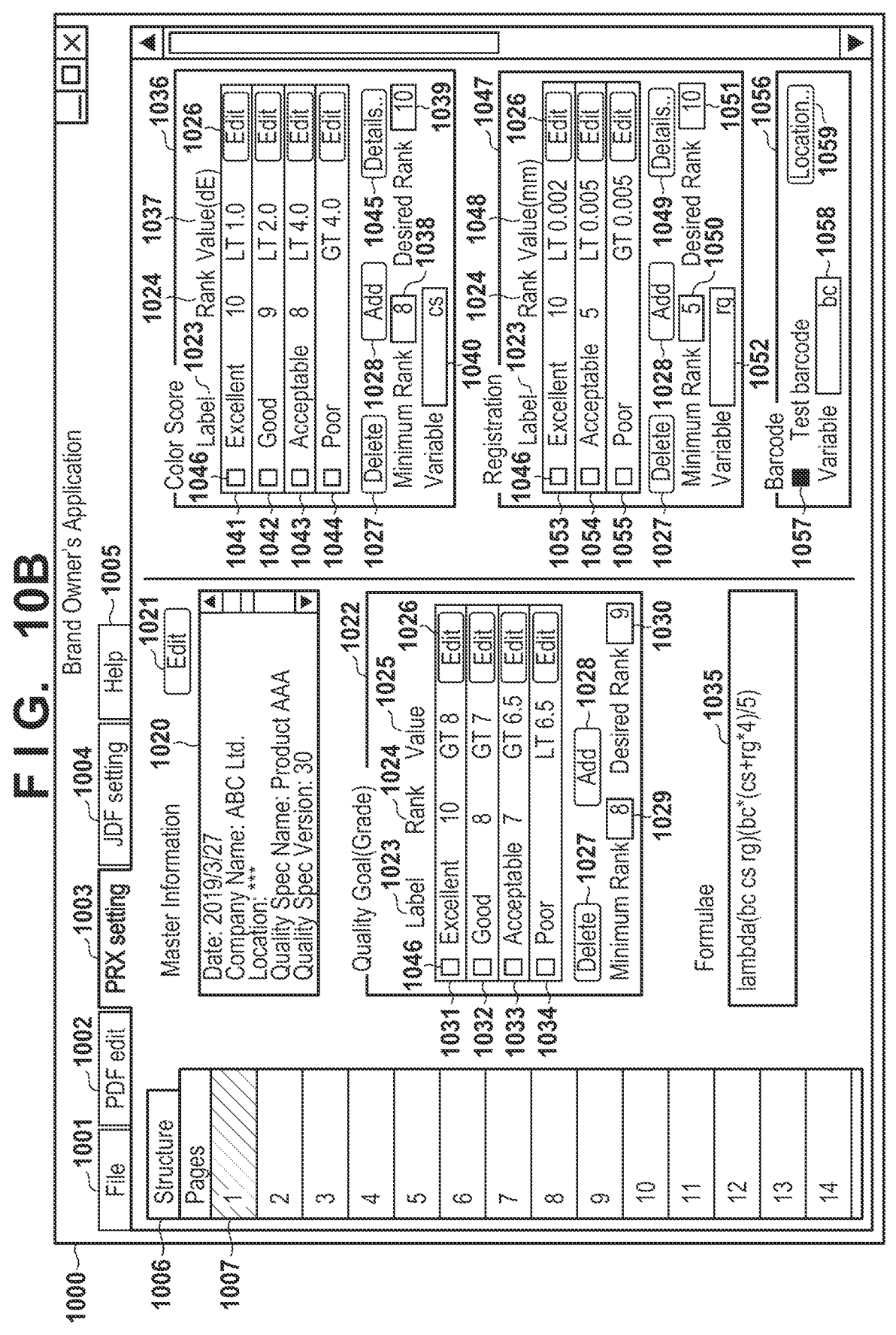

FIGS. 10A and 10B are views for explaining the configuration of a screen used by an orderer to create submission data on the information processing apparatus 110 of the orderer system 109.

FIG. 10A shows an example of an application screen used to create or edit PDF that is image data of a submission target on the information processing apparatus 110 of the orderer system 109. Note that the application according to this embodiment shows an example of an application in a form in which application functions of a plurality of purposes are provided in parallel by a single application and selectively used by a function tab. Hence, a general-purpose function setting portion 1001, a PDF edit portion 1002, a PRX setting portion 1003, a JDF setting portion 1004, and a help function providing portion 1005 are selectively used. Each of these means is configured to be operated by selecting a corresponding tab.

FIG. 10A shows an example of the screen in a state in which the PDF edit setting portion 1002 is selected. A page selection portion 1006 is a region where a setting target page is selected if a print target product is formed by a plurality of pages, and a different quality request is to be set for each page. FIG. 10A shows a state in which a first page (1007) is selected. That is, FIG. 10A shows an example when setting a quality request for the first page of the print target image data.

A thumbnail display region 1008 is a reference image display region used by the user of the application shown in FIG. 10A who executes various kinds of settings while confirming the image information of the page selected in the page selection portion 1006. This corresponds to additional image information necessary for inspecting quality conditions requested by PRX (to be described later), such as the registration marks 917, the color patches 916, and the barcode 920 shown in FIG. 9C, by the printing company system 100 and generating PQX as the result.

The registration marks 917 are set by a registration mark setting portion 1013. If addition of registration marks to the image is instructed by the registration mark setting portion 1013, the registration marks 917 are added to the setting target page of the PDF file. By a color patch setting portion 1012, the color patches 916 can be added to the setting target page of the PDF file.

A registration mark detail setting portion 1015 and a color patch detail setting portion 1014 are setting portions configured to set detailed information such as positions to add the color patches 916 or the registration marks 917 to the image. For example, if the registration marks 917 or the color patches 916 are superimposed in the region of the image information 915 of PDF, a trouble occurs because the original image cannot be obtained. Hence, in the application according to this embodiment, to prevent the positions of the color patches 916 or the registration marks 917 from overlapping the region of the image information 915, these means can adjust the coordinates of the image positions.

A barcode information designation portion 1016 is a designation portion configured to designate the position of a barcode image corresponding portion included in the PDF image information 915. That is, the barcode information designation portion 1016 is formed by an x-coordinate input portion 1017 and a y-coordinate input portion 1018, which represent the arrangement position of the barcode from the origin 921, and a size information input portion 1019 of the barcode image portion.

An output intent setting portion 1009 is an output intent information setting portion implemented by a PDF edit function. The output intent setting portion 1009 is formed by an image forming process information setting portion 1010 used by an image forming means applied at the time of production, and a color intent setting portion 1011 applied to an image to be produced. These pieces of output intent information are configured to enable individual settings on a page basis by combining the page selection portion 1006.

FIG. 10B shows an example of an application screen used to create or edit PRX that is quality request data of a submission target on the information processing apparatus 110 of the orderer system 109. When the PRX setting portion 1003 is selected, display control of the screen shown in FIG. 10B is performed. Like the PDF creation portion 1002 shown in FIG. 10A, the page selection portion 1006 is provided to set PRX for each of the pages as the print target. The example shown in FIG. 10B shows an example of the screen in a state in which the first page (1007) is selected.

A master information setting portion 1020 is a setting portion configured to input various kinds of master information necessary when creating PRX. The master information includes various kinds of information such as a date requested by the specifications of PRX, company information, and a name added to the requested specifications defined by PRX. These pieces of information can be edited by pressing a master information edit portion 1021.

A comprehensive quality goal setting portion 1022 is a setting portion configured to integrate at least one or more quality request matters of different types designated in PRX and define an overall quality level (comprehensive quality level). The comprehensive quality level is defined by the combination of a label 1023, a rank 1024, and a value 1025 to be described next. The label 1023 is readable information added to the quality level. In this example, labels such as Excellent, Good, Acceptable, and Poor are used. The rank (or ranking) 1024 is quantitative numerical value information corresponding to the label 1023. This may be called an evaluation value or a comprehensive evaluation value. The value 1025 defines a parameter and a formula for deciding the rank 1024.

More specifically, details will be described below using a highest quality 1031 as an example. The label of the highest quality 1031 is defined as "Excellent". A character string applied to the label 1023 can arbitrarily be set by the user, that is, the orderer who uses the application shown in FIG. 10B, which operates on the information processing apparatus 110 of the orderer system 109. In other words, the label 1023 is information provided to allow the operator to easily discriminate the meaning of the defined quality level, and has a characteristic different from information used in control or the like.

On the other hand, the value of the rank 1024 of the highest quality 1031 is defined as 10. This is a numerical value defined by the orderer to quantitatively discriminate and manage the quality of the product requested from the orderer to the printing company, and is information aiming at being used in control or the like. However, the numerical value of the rank 1024 itself can arbitrarily be defined by the orderer as the quantitative numerical value of the quality of the product.

FIG. 10B shows an example in which the value 1025 for defining the rank 1024 of the highest quality 1031 is "GT 8". That is, if the numerical value of a quantitative quality index calculated by a formula setting portion 1035 to be described later is 8 or more, the value 1025 of the highest quality 1031 is calculated as 10, and the quality of the product is discriminated as the highest quality.

The remaining quality levels are also defined such that ranks and labels "Good" 1032, "Acceptable" 1033, and "Poor" 1034 are determined uniquely by similar numerical values and values calculated by the formula. Note that this embodiment employs a configuration in which information defined for each quality level can be edited by a quality level editing portion 1026.

The number of quality levels can arbitrarily be set. That is, when designating finer levels as needed, a level adding portion 1028 is pressed, thereby adding a new quality level to the comprehensive quality goal setting portion 1022. Also, a level with a check mark 1046 can be deleted by a level deletion portion 1027.

When the orderer sends a quality request to the printing company, an acceptance condition is defined by the numerical value of the rank 1024 defined by the quality level concerning the quality of the produced product. The acceptance condition is defined by a minimum acceptable quality setting portion 1029 and a desired quality setting portion 1030.

The minimum acceptable quality setting portion 1029 is used by the orderer to define, to the printing company, acceptable quality, that is, the minimum value of the rank 1024 in delivering the product. In other words, it is possible to transmit, to the printing company, a quality request matter representing that a product for which the numerical value of the rank 1024 is less than the numerical value defined in the minimum acceptable quality setting portion 1029, that is, 8 in the example shown in FIG. 10B does not satisfy the acceptable quality.

The desired quality setting portion 1030 is used by the orderer to define, to the printing company, a desired quality condition, that is, the desired value of the rank 1024 in delivering the product. In other words, it is possible to transmit, to the printing company, information representing that a product for which the numerical value of the rank 1024 is equal to or larger than the numerical value defined in the desired quality setting portion 1030, that is, 9 in the example shown in FIG. 10B satisfies the quality request matter.

A color quality setting portion 1036 is a setting portion configured to input quality request information concerning the color of the product when creating PRX. Like the comprehensive quality goal setting portion 1022, the color quality setting portion 1036 is configured to designate the level of a quality request concerning the color by means for setting the label 1023 and the rank 1024.

A color quality value 1037 is defined based on a color difference (ΔE, also called delta E) of a color value that is the colorimetric result of the product with respect to the requested color. That is, an example in which the color difference is 1.0 or less for a highest quality 1041 in color quality is shown. That is, FIG. 10B shows an example in which for the highest quality 1041, the label 1023 is "Excellent", and the rank is 10. Similarly, FIG. 10B shows an example in which similar definitions are made even for "good product" 1042, "acceptable" 1043, and "poor quality" 1044 in color quality. Rank adding and deletion functions are implemented by the same mechanism as in the comprehensive quality goal setting portion 1022, and a description thereof will be omitted.

Like the comprehensive quality goal setting portion 1022, the color quality setting portion 1036 defines an acceptance condition when the orderer sends a quality request concerning the color to the printing company. The acceptance condition is defined by the numerical value of the rank 1024 defined by the above-described quality level concerning the color quality of the produced product. The acceptance condition is defined by a minimum acceptable color quality setting portion 1038 and a desired color quality setting portion 1039 concerning the color quality.

The minimum acceptable color quality setting portion 1038 is used by the orderer to define, to the printing company, acceptable color quality, that is, the minimum value of the rank 1024 in delivering the product. In other words, it is possible to transmit, to the printing company, a color quality request matter representing that a product for which the numerical value of the rank 1024 is less than the numerical value defined in the minimum acceptable color quality setting portion 1038, that is, 8 in the example shown in FIG. 10B does not satisfy the acceptable color quality.

The desired color quality setting portion 1039 is used by the orderer to define, to the printing company, a desired color quality condition, that is, the desired value of the rank 1024 in delivering the product. In other words, it is possible to transmit, to the printing company, information representing that a product for which the numerical value of the rank 1024 is equal to or larger than the numerical value defined in the desired color quality setting portion 1039 (10 in the example shown in FIG. 10B) satisfies the desired color quality request matter.

A color quality variable setting portion 1040 is a setting portion configured to define a variable used to cite a rank concerning the color quality from the formula setting portion 1035 configured to calculate the value 1025 in the comprehensive quality goal setting portion 1022. The formula setting portion 1035 will be described later. In this embodiment, the value of the rank 1024 concerning the color quality can be referred by the color quality variable setting portion 1040 using a variable "cs".

An image position deviation quality setting portion 1047 is a setting portion configured to input quality request information concerning the image position deviation of the product when creating PRX. Like the comprehensive quality goal setting portion 1022, the image position deviation quality setting portion 1047 is configured to designate the level of a quality request concerning the image position deviation by means for setting the label 1023 and the rank 1024.

An image position deviation quality value 1048 is defined based on a deviation amount (a length or the distance between a reference image and the image of the product) from a reference position that is the measurement result of the product with respect to the requested image position deviation. That is, an example in which the deviation amount is 0.002 mm or less for a highest quality 1053 in image position deviation quality is shown. That is, FIG. 10B shows an example in which for the highest quality 1053, the label 1023 is "Excellent", and the rank is 10. Similarly, FIG. 10B shows an example in which similar definitions are made even for "good product" 1054 and "poor quality" 1055 in image position deviation quality. Rank adding and deletion functions are implemented by the same mechanism as in the comprehensive quality goal setting portion 1022, and a description thereof will be omitted.

Like the comprehensive quality goal setting portion 1022, the image position deviation quality setting portion 1047 defines an acceptance condition when the orderer sends a quality request concerning the image position deviation to the printing company. The acceptance condition is defined by the numerical value of the rank 1024 defined by the above-described quality level concerning the image position deviation quality of the produced product. The acceptance condition is defined by a minimum acceptable image position deviation quality setting portion 1050 and a desired image position deviation quality setting portion 1051 concerning the image position deviation quality.

The minimum acceptable image position deviation quality setting portion 1050 is a setting portion used by the orderer to define, to the printing company, acceptable image position deviation quality, that is, the minimum value of the rank 1024 in delivering the product. It is possible to transmit, to the printing company, an image position deviation quality request matter representing that a product for which the numerical value of the rank 1024 is less than the numerical value defined in the minimum acceptable image position deviation quality setting portion 1050, that is, 5 in the example shown in FIG. 10B does not satisfy the acceptable image position deviation quality.

The desired image position deviation quality setting portion 1051 is a setting portion used by the orderer to define, to the printing company, a desired image position deviation quality condition, that is, the desired value of the rank 1024 in delivering the product. It is possible to transmit, to the printing company, information representing that a product for which the numerical value of the rank 1024 is equal to or larger than the numerical value defined in the desired image position deviation quality setting portion 1051 (10 in the example shown in FIG. 10B) satisfies the image position deviation quality request matter.

An image position deviation quality variable setting portion 1052 is a setting portion provided to define a variable used to cite the value of the rank 1024 concerning the image position deviation quality from the formula setting portion 1035 configured to calculate the value 1025 in the comprehensive quality goal setting portion 1022. The formula setting portion 1035 will be described later. In this embodiment, an example is shown in which the value of the rank 1024 concerning the image position deviation quality can be referred by the image position deviation quality variable setting portion 1052 using a variable "rg".

A barcode read quality setting portion 1056 is a setting portion configured to input quality request information concerning the read accuracy of a barcode image included in a print target image when creating PRX. Here, information different from the comprehensive quality goal setting portion 1022 is set. As for the barcode read quality, information serving as an index for expressing quality is not a physical amount, and whether barcode information can be read or not is used as an evaluation criterion, unlike the color quality or image position deviation quality. Whether inspection of barcode quality can be executed is controlled not by the designation using the rank 1024 but a barcode read instruction setting portion 1057. A barcode position information setting portion 1059 is a setting portion configured to designate, by coordinates, the position of the barcode as the inspection target in the image.

A barcode read quality variable setting portion 1058 is a setting portion configured to define a variable used to cite an evaluation value concerning the barcode read quality from the formula setting portion 1035 configured to calculate the value 1025 in the comprehensive quality goal setting portion 1022. The evaluation value concerning the barcode read quality can be referred by the barcode read quality setting portion 1056 using a variable "bc". Here, the evaluation value of the barcode read quality is calculated as 1 if the barcode can be read, and as 0 if the barcode cannot be read.

The formula setting portion 1035 is a setting unit configured to integrate the inspection results of the color quality setting portion 1036, the image position deviation quality setting portion 1047, the barcode read quality setting portion 1056 described above and define a formula used to derive the comprehensive quality goal setting portion 1022. More specifically, the formula setting portion 1035 stores a formula used to derive the value 1025 in the comprehensive quality goal setting portion 1022 from the color quality variable setting portion 1040, the image position deviation quality variable setting portion 1052, the barcode read quality variable setting portion 1058, and values stored in the variables.

Various means are applied as a method of expressing the formula. Here, the formula is expressed by a Lambda expression. As another form, an anonymous function is expressed by the format of an arbitrary programming language or script language. Alternatively, the formula need not be limited to a function. A programming language or a script language may directly be described, and the value of the result of executing the programming language or the script language by the application program may be obtained. There is also a method of defining a formula by another means, giving a name to the formula, and setting the name in the formula setting portion 1035.

Processing contents in a case in which the value 1025 in the comprehensive quality goal setting portion 1022 is derived by the formula setting portion 1035 will be described below using a detailed example. For example, assume a case in which quality data included in PQX created by the image forming apparatus 104 and the workflow control program 505 based on a criterion set in PRX is as follows. PQX creation processing will be described later. Note that PRX is set based on the inspection results of the color quality setting portion 1036, the image position deviation quality setting portion 1047, and the barcode read quality setting portion 1056.

EXAMPLE color quality measurement value (delta E): 1.5 (variable cs=9)

image position deviation quality measurement value (mm): 0.002 (variable rg=10)

barcode read quality measurement value (read success/failure): success (variable bc=1)

When the above data are applied to the formula set in the formula setting portion 1035 shown in this embodiment, the evaluation value is calculated as follows.

$$bc*(cs + rg*4)/5 = 1*(9 + 10*4)/5$$
$$= 9.8$$

That is, the value 1025 in the comprehensive quality goal setting portion 1022 is 9.8, and the rank 1024 is 10. That is, the rank 1031 of the highest quality whose label is "Excellent" is derived.

<UI of Job Ticket Creation Application>

FIG. 10C shows an example of an application screen configured to create or edit a job ticket, that is, JDF data that is the print setting information of a submission target on the information processing apparatus 110 of the orderer system 109. When the JDF setting portion 1004 is selected, display control of the screen shown in FIG. 10C is performed. The system according to this embodiment is configured such that more detailed setting items can be selected in the JDF setting portion 1004, as shown in FIG. 10C. That is, a general setting portion 1060, a media setting portion 1061, an imposition setting portion 1062, an insertion sheet setting portion 1063, an image processing setting portion 1064, and a post-processing setting portion 1065 can be selected for each setting target function. The screen example shown in FIG. 10C shows an example of the display state of the screen when the media setting portion 1061 is selected.

As shown in FIG. 10C, the JDF setting portion 1004 includes a whole job media setting portion 1066 and a partial job media setting portion 1068. The whole job media setting portion 1066 is provided to select a medium to be used in a job. That is, the example shown in FIG. 10C shows a state in which "Medial" is selected in the whole job media setting portion 1066. In other words, this means that the medium to be used in printing when executing print processing by the JDF is set to "Medial". On the other hand, the partial job media setting portion 1068 is a setting means used to set a medium different from the medium set in the whole job media setting portion 1066 to a specific page or page range. In the example shown in FIG. 10C, a setting target page range adding portion 1069, the check box 1046, and a page range erase portion 1070 provide creation and erase means for a page range as the setting target of the partial job media setting portion 1068.

FIG. 10C shows a state in which two page ranges are created. That is, in a first page range setting 1071, a first page range 1073 is set. In the first page range 1073, an example is shown in which page 5, pages 200 to 210, and page 250 are selected as setting targets, and "Media2 (coated)" in a first partial media selection portion 1074 is used as a medium to be used for the setting target pages.

In a second page range setting portion 1072, a second page range 1075 is set. In the second page range 1075, an example is shown in which page 1 is selected as a setting target, and "Media3 (cardboard)" in a second partial media selection portion 1076 is used as a medium to be used for the setting target page.

Example of Document Submission Application Screen

Figure 11A:
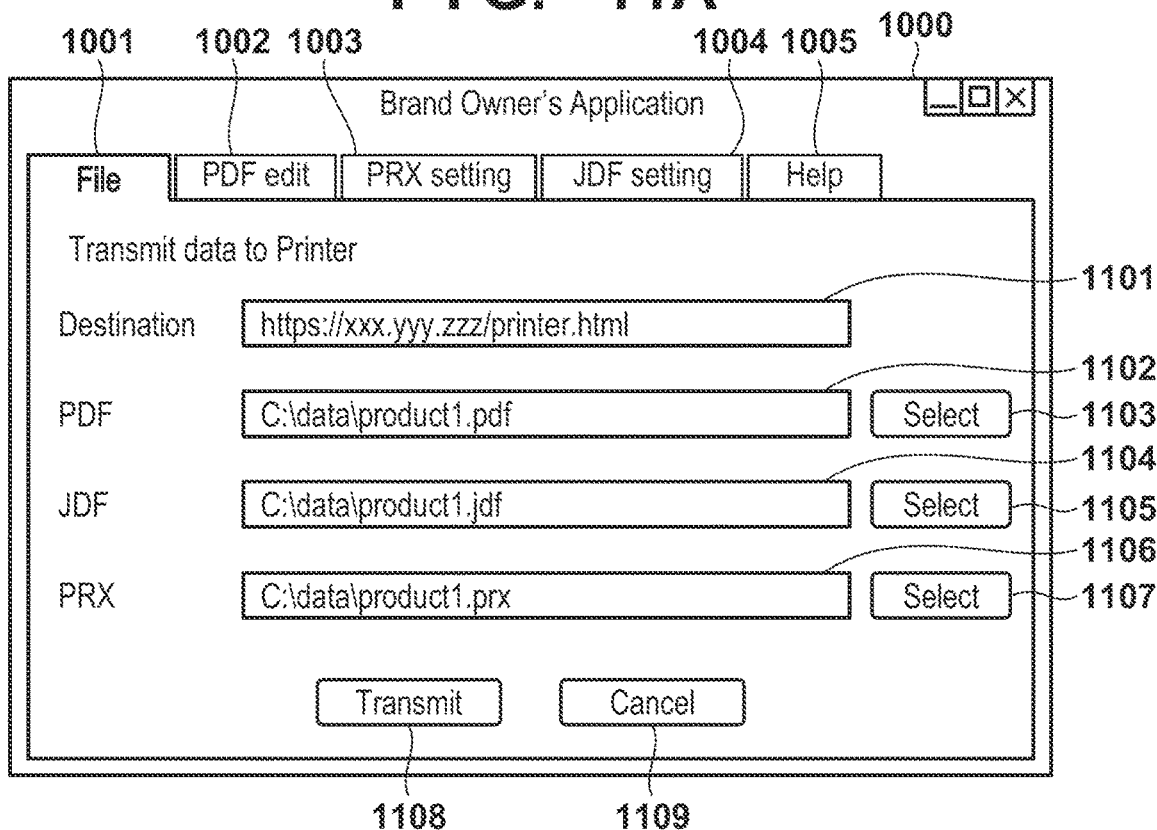
FIG. 11A is a second view for explaining the operation unit of the application system that operates in the information processing apparatus of the orderer system according to the first embodiment.
Figure 11B:
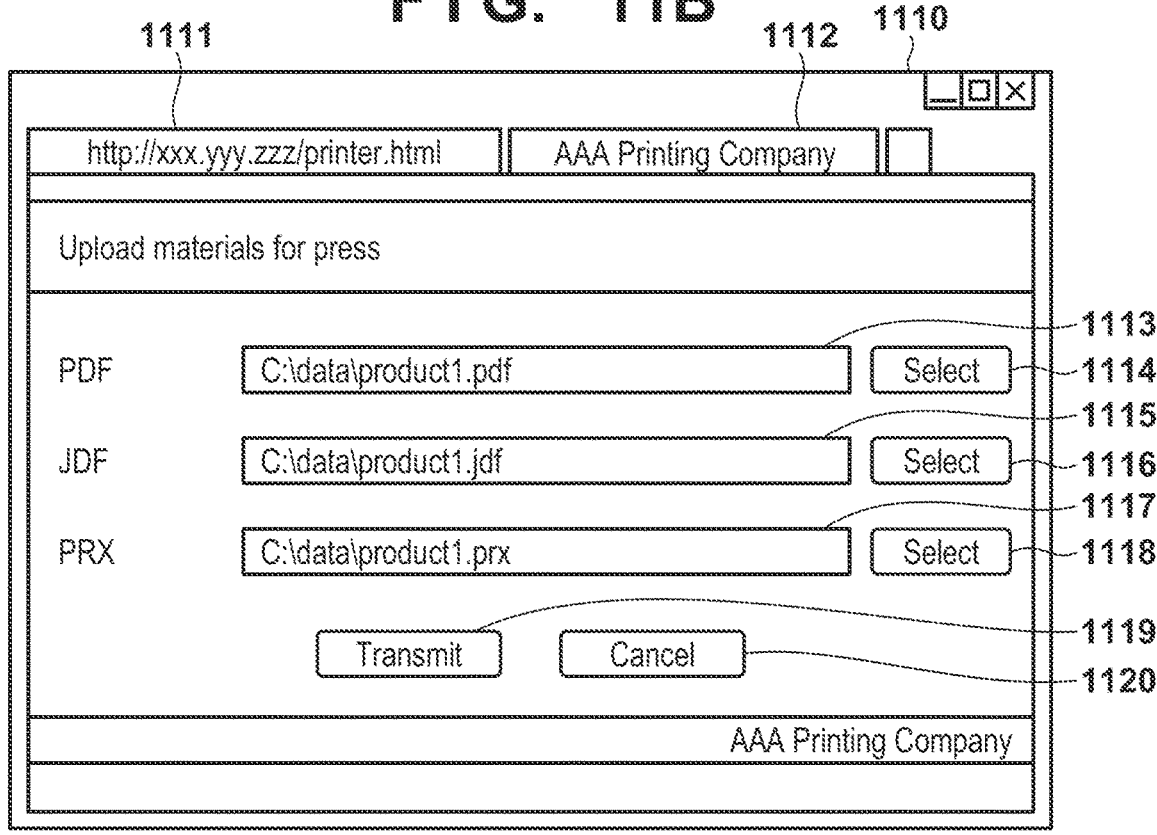
FIG. 11B is a second view for explaining the operation unit of the application system that operates in the information processing apparatus of the orderer system according to the first embodiment.

FIGS. 11A and 11B show an example of an application screen when executing, on the information processing apparatus 110 of the orderer system 109, processing of submitting PRX, JDF, and PDF as quality request data of a submission target to the printing company system 100.

FIG. 11A shows an example of a screen 1000 in a case in which a function of transmitting submission data to the printing company system 100 is provided as part of a function of the application shown in FIGS. 10A to 10C. That is, the system according to this embodiment is configured to display the screen shown in FIG. 11A when the general-purpose function setting portion 1001 is selected.

A transmission destination information setting portion 1101 is a designation portion configured to designate the address of a web service provided as a document submission means by the web server 504 operating on the information processing apparatus 102 of the printing company system 100.

A first PDF file selection portion 1102 and a first PDF file selection instruction portion 1103 are selection portions configured to select a PDF file that is image data of a submission target from a file system provided in the information processing apparatus 110 of the orderer system 109.

A first JDF file selection portion 1104 and a first JDF file selection instruction portion 1105 are selection portions configured to select a JDF file that is job setting data of a submission target from the file system provided in the information processing apparatus 110 of the orderer system 109.

A first PRX file selection portion 1106 and a first PRX file selection instruction portion 1107 are selection portions configured to select a PRX file that is quality request data of a submission target from the file system provided in the information processing apparatus 110 of the orderer system 109.

When a data set necessary for document submission is selected by the above-described selection portions, appropriate transmission destination information is set, and the first transmission instruction portion 1108 is selected, the submission data set is transmitted to the printing company system 100. A first processing stop instruction portion 1109 is an instruction portion configured to stop the document submission processing itself.

FIG. 11B is a view for explaining the display state of the screen in a case in which a function equivalent to the submission instruction portion by the application shown in FIG. 11A is provided by an operation of a web browser.

That is, the operator inputs transmission destination information to an address input portion 1111 of the web browser. Accordingly, as the result of accessing the address of the web service provided as a document submission means by the web server 504 operating on the information processing apparatus 102 of the printing company system 100, the screen transitions to the state of a document submission web screen as shown in FIG. 11B (1110, 1112).

As shown in FIG. 11B, selection portions having functions equivalent to the file selection portions shown in FIG. 11A are provided as a screen of the web browser. That is, a second PDF file selection portion 1113 and a second PDF file selection instruction portion 1114 correspond to the functions of the first PDF file selection portion 1102 and the first PDF file selection instruction portion 1103, respectively.

A second JDF file selection portion 1115 and a second JDF file selection instruction portion 1116 correspond to the functions of the first JDF file selection portion 1104 and the first JDF file selection instruction portion 1105, respectively.

A second PRX file selection portion 1117 and a second PRX file selection instruction portion 1118 correspond to the functions of the first PRX file selection portion 1106 and the first PRX file selection instruction portion 1107, respectively.

A second transmission instruction portion 1119 corresponds to the function of the first transmission instruction portion 1108, and a second processing stop instruction portion 1120 corresponds to the function of the first processing stop instruction portion 1109.

Since the functions equivalent to the means shown in FIG. 11B have been described with reference to FIG. 11A, the description of the functions will be omitted.

Example of Submission Data

FIGS. 12A to 12N show examples of various kinds of submission target data generated when the operator operates the operation means shown in FIG. 10. Details will be described for each data type.

<Example of Job Ticket (FIG. 12A)>

FIG. 12A shows an example of a job ticket in the JDF format generated by a means for creating or editing JDF data as a job ticket that is print setting information of a submission target in FIG. 10C, that is, on the information processing apparatus 110 of the orderer system 109.

The job ticket includes the following information. That is, a number 1201 of pages included in a print product of one copy, a whole job print parameter 1202, and partial job print parameters 1206 and 1208 are included.

The whole job print parameter 1202 includes a total number 1203 of copies to be printed, and a media setting 1204 to be used in the whole job. The partial job print parameters 1206 and 1208 include pieces of page range information 1205 and 1209 designated as parts, and media settings 1207 and 1210 to be used in the parts.

The actual setting contents of the media setting 1204 used in the whole job and the media settings 1207 and 1210 used in the parts of the job are defined in media tags 1211, 1214, and 1217. The media tags 1211, 1214, and 1217 further include setting information such as media types 1213, 1216, and 1219 and media sizes 1212, 1215, and 1218.

<Example of PRX Data (FIGS. 12B to 12D)>

FIGS. 12B to 12D show an example of PRX data generated by a means for creating or editing PRX that is quality request data of a submission target in FIG. 10B, that is, on the information processing apparatus 110 of the orderer system 109.

The PRX data includes the following information. That is, master information 1220 and comprehensive quality goal setting information 1221 are included (see FIG. 12B).

The comprehensive quality goal setting information 1221 further includes defining portions 1222, 1223, 1224, and 1225 for quality levels, a formula defining portion 1226, minimum acceptable quality setting information 1227, and desired quality setting information 1228. Meanings of information equivalent to these have been described with reference to FIG. 10B, and a description thereof will be omitted.

Color quality information defining portion 1229 is formed by information storing various kinds of setting information concerning the color quality of the product (see FIG. 12C). That is, a unit information defining portion 1231 configured to define a color difference that is color quality, a reference color information defining portion 1232 that is color information serving as a reference, and defining portions 1233, 1234, 1235, and 1236 for color quality levels are included. Note that the reference color information defining portion 1232 refers to the ID of a CXF information defining portion 1258. To calculate the degree of color quality, a spectral spectrum information storage portion 1259 is used as a reference value.

Also, minimum acceptable color quality setting information 1237, desired color quality setting information 1238, color quality variable setting information 1239, and color quality measurement coordinate information 1240 are included. Meanings of information equivalent to these have been described with reference to FIG. 10B, and a description thereof will be omitted.

An image position deviation quality information defining portion 1241 is provided to store quality request information concerning the image position deviation between the obverse and reverse surfaces of the product (see FIG. 12D). More specifically, unit information defining portion 1242, defining portions 1243, 1244, and 1245 for quality levels, minimum acceptable quality setting information 1246, desired quality setting information 1247, quality variable setting information 1248, and quality measurement coordinate information 1249 are included. Here, the unit information defining portion 1242 defines a unit amount used to measure the image position deviation. In addition, a barcode read quality defining portion 1250 is provided to store quality request information concerning the read accuracy of a barcode image included in the product. More specifically, barcode read quality information defining portions 1251 and 1252, a barcode read quality variable defining portion 1255, and a minimum barcode read quality defining portion 1253 are included. Furthermore, a desired barcode read quality defining portion 1254 and a barcode read target coordinate defining portion 1256 are included. Meanings of information equivalent to these have been described with reference to FIG. 10B, and a description thereof will be omitted.

A reference color detailed information defining portion 1257 is provided to define reference data (a correct answer value or a reference value) desired as color quality. As a detailed example in this embodiment, the CXF information defining portion 1258 and the spectral spectrum information storage portion 1259 as one of color information expression means included in it are included.

An extension information storage portion 1260 can arbitrarily be used as a region to store additional information in PRX. In this embodiment, when the orderer requests the printing company to do production, the delivery form of the product is designated and instructed. In the example shown in FIG. 12D, information representing that the product is delivered as a cut sheet is stored in a delivery form designation portion 1261. In other words, when performing production using submitted data and delivering the product, the printing company that has accepted the PRX is instructed to finally deliver the product in a form of a cut sheet.

In addition, formula defining portions 1262 (see FIG. 12C), 1263, and 1264 define formulas used to calculate the degrees of color quality, image position deviation quality, and barcode read quality, respectively. The formulas have been described concerning the formula setting portion 1035 shown in FIG. 10B, and a description thereof will be omitted.

How to decide a specific quality level from measurement data for a request and quality level described in PRX will be described here using an example.

In the PRX shown in FIGS. 12B to 12D, the reference value of the color is the CXF information defining portion 1258 indicated by the reference color information defining portion 1232 (see FIG. 12D). A detailed reference value is defined by the spectral spectrum information storage portion 1259. In PQX shown in FIGS. 12F to 12H, the measurement value of the color is a spectral spectrum data storage portion 1285 (see FIG. 12H).

To calculate the quality level of the color, the following formula defined by the formula defining portion 1262 is used. This formula compares the spectral spectrum information storage portion 1259 that is the reference value with the spectral spectrum data storage portion 1285 that is the measurement value, thereby calculating the difference.

Compare ('CxFReference', 'PQX measurement set')

Assuming that the calculation result is 1.5, ValueRange defined by the defining portions 1233, 1234, 1235, and 1236 is as follows.

For the defining portion 1233, the calculation result is 1.0 or less.

For the defining portion 1234, the calculation result ranges from 1.0 (exclusive) to 2.0 (inclusive).

For the defining portion 1235, the calculation result ranges from 2.0 (exclusive) to 4.0 (inclusive).

For the defining portion 1236, the calculation result ranges from 4.0 (exclusive) to 5.0 (inclusive).

In the defining portions 1233 to 1236, the quality level defining portion 1234 (the calculation result ranges from 1.0 (exclusive) to 2.0 (inclusive)) corresponds to the calculation result of 1.5. Hence, the color quality level is the defining portion 1234. That is, a rank 9 and a label "Good" are derived.

In this way, for each of the inspection target items, the evaluation value is calculated by applying a predetermined formula to the inspection result, thereby deciding the rank. The evaluation is performed not only for the color quality but also for all target items.

<Example of Inspection Results (FIG. 12E)>

FIG. 12E is a view for explaining an example of inspection results obtained when the inspection unit 214 provided in the image forming apparatus 103 or 104 executes inspection of image information formed on a sheet as a product. The information shown in FIG. 12E is created by the controller unit 205 executing the inspection program 410 held by the image forming apparatus 103 or 104, and transmitted to the workflow control program 505 operating on the information processing apparatus 102. Information included in the inspection result data will be described below.

Inspection execution sheet information 12651 is provided to store information about the number of sheets from the start of a job when the inspection unit 214 of the image forming apparatus 104 for cut sheets executes inspection. This information aims at being designated when delivery in cut sheet finishing is instructed in the delivery form designation portion 1261 shown in FIG. 12D, and production is performed using the image forming apparatus 104 for cut sheets.

On the other hand, a sheet inspection position designation portion 12652 is provided to store, as a length, the position of a sheet from the head of roll paper when the inspection unit 214 of the image forming apparatus 103 for a continuous form sheet executes inspection. This information aims at being designated when delivery in roll sheet finishing is instructed in the delivery form designation portion 1261, and production is performed using the image forming apparatus 103 for a continuous form sheet.

Note that for the descriptive convenience, the example of FIG. 12E shows a state in which the inspection execution sheet information 12651 and the sheet inspection position designation portion 12652 are simultaneously included. In fact, these are assumed to be exclusively used in accordance with the designated delivery form.

In addition, the delivery form does not necessarily match the type of the image forming apparatus used in production, and an otherwise case is also assumed in the embodiment of the present invention. That is, print processing is executed by the image forming apparatus 103 for a continuous form sheet, and the sheet is processed by cut sheet finishing in the post-processing step and delivered. In this case, it can be assumed that one or both of the inspection execution sheet information 12651 and the sheet inspection position designation portion 12652 are stored. In that case, the workflow control unit 707 performs control such that information representing the inspection position is stored in PQX by an appropriate mode according to the delivery form when creating PQX in steps S728 and S729.

Spectral spectrum data 12653 is numerical data of a spectral spectrum that is color information of the image on the sheet and is obtained by the third inspection unit 912 and the fourth inspection unit 913, shown in FIG. 9B, in the inspection unit 214. This is stored in PQX data to be described later and used to provide the inspection result concerning color quality to the orderer.

Image position deviation inspection result data 12654 is numerical data of a deviation amount concerning the position deviation quality of the image on the sheet and is obtained by the first inspection unit 907 and the second inspection unit 908, shown in FIG. 9B, in the inspection unit 214. This is stored in PQX data to be described later and used to provide the inspection result concerning image position deviation quality to the orderer.

Barcode read inspection result data 12655 is data concerning the result of read inspection of the barcode image on the sheet and is obtained by the first inspection means 907 and the second inspection means 908, shown in FIG. 9B, in the inspection unit 214. This is stored in PQX data to be described later and used to provide the inspection result concerning barcode read quality to the orderer.

<Example of PQX Data (FIGS. 12F to 12H)>

FIGS. 12F to 12H show an example of print quality report data, that is, PQX data created by the workflow control program 505 receiving inspection information created by the inspection unit 214 provided in the image forming apparatus 103 or 104. Pieces of inspection information are shown in FIGS. 12F to 12H. Pieces of main information in the information included in PQX will be described.

PQX header information 1267 is an area to store main information to be held by the PQX data.

A work report storage portion 1268 is used to store a quality inspection result obtained when the image forming apparatus 103 or 104 executes processing and general-purpose information associated with the quality inspection result. In this embodiment, an example in a case in which a production condition in executing quality inspection is stored is shown. More specifically, the work report storage portion 1268 stores roll delivery total sheet information 1269 if the delivery form is roll finishing, or stores cut sheet delivery total sheet information 1270 if the delivery form is cut sheet finishing. Reporter information 1271 stores the name of a reporter.

An inspection result storage area 1272 is a storage portion provided to identify various kinds of inspection results concerning product creation quality, which are executed by the inspection unit 214, for each inspection type and store these. The contents of quality inspection results stored in this area will be described below (see FIG. 12G).

Position information of the quality inspection result executed by the inspection unit 214 provided in the image forming apparatus 103 or 104 is stored in the inspection result storage area 1272. More specifically, if the delivery form is roll finishing, roll delivery sheet information 1273 is stored. If the delivery form is cut sheet finishing, cut sheet delivery sheet information 1274 is stored.

The roll delivery sheet information 1273 and the cut sheet delivery sheet information 1274 aim at providing position information serving as a reference to specify coordinates on a sheet when various kinds of quality inspection are executed. More specifically, if delivery is to be done in roll finishing, when designating a point where quality inspection was executed, a roll number and position information represented by a length from the top of roll paper are stored in the roll delivery sheet information 1273. If delivery is to be done in cut sheet finishing, sheet count information from the start of the job concerning image formation in the job, which is used to designate a point where quality inspection was executed, and information about the lot number in delivery are stored.

A color quality report storage portion 1275 is an area to store report information concerning color information in the quality report information included in PQX and sent from the printing company to the orderer. The information in this area is created based on the spectral spectrum data 12653 shown in FIG. 12E. That is, a reference link 1276 of the spectral spectrum data 12653, a spectral spectrum data storage portion 1285 which the reference link 1276 refers to, spectral spectrum data 1286 (see FIG. 12H), and a measurement position designation portion 1277 in the embodiment correspond to this.

The measurement position designation portion 1277 is used in combination with the roll delivery sheet information 1273 or the cut sheet delivery sheet information 1274. More specifically, if the delivery form designated in PRX is roll finishing, the measurement position designation portion 1277 shows the relative coordinate positions of the color patch 916 or 919 from the origin, for which read inspection is executed by the third inspection unit 912 and the fourth inspection unit 913. In this example, the coordinate positions are represented by main and sub coordinates stored in the measurement position designation portion 1277 using position information from the sheet top represented by the numerical value of the roll delivery sheet information 1273 representing integrated length information from the roll top.

Alternatively, if the delivery form designated in PRX is cut finishing, the measurement position designation portion 1277 shows the relative coordinate positions of the color patch 916 or 919 from the origin, for which read inspection is executed by the third inspection unit 912 and the fourth inspection unit 913. In this example, the coordinate positions are represented by the sheet count from the start of the job represented by the numerical value of the cut sheet delivery sheet information 1274 and main and sub coordinates on the sheet corresponding to the count, which are stored in the measurement position designation portion 1277.

An image position deviation quality report storage portion 1278 is an area to store report information concerning image position deviation information in the quality report information included in PQX and sent from the printing company to the orderer. The information in this area is created based on the image position deviation inspection result data 12654 shown in FIG. 12E.

A measurement position designation portion 1281 is used in combination with the roll delivery sheet information 1273 or the cut sheet delivery sheet information 1274. More specifically, if the delivery form designated in PRX is roll finishing, the measurement position designation portion 1281 shows the relative coordinate positions of the registration mark 917 or 918 from the origin, for which read inspection is executed by the first inspection unit 907 and the second inspection unit 908. In this example, the coordinate positions are represented by main and sub coordinates stored in the measurement position designation portion 1281 using position information from the sheet top represented by the numerical value of the roll delivery sheet information 1273 representing integrated length information from the roll top.

Alternatively, if the delivery form designated in PRX is cut finishing, the measurement position designation portion 1281 shows the relative coordinate positions of the registration mark 917 or 918 from the origin, for which read inspection is executed by the first inspection unit 907 and the second inspection unit 908. The coordinate positions are represented by the sheet count from the start of the job represented by the numerical value of the cut sheet delivery sheet information 1274 and main and sub coordinates on the sheet corresponding to the count, which are stored in the measurement position designation portion 1281.

A barcode read quality storage portion 1282 is an area to store report information concerning barcode read quality information in the quality report information included in PQX and sent from the printing company to the orderer. The information in this area is created based on the barcode read inspection result data 12655 shown in FIG. 12E.

A measurement position designation portion 1284 is used in combination with the roll delivery sheet information 1273 or the cut sheet delivery sheet information 1274. More specifically, if the delivery form designated in PRX is roll finishing, the measurement position designation portion 1284 shows the relative coordinate positions of the barcode 920 from the origin, for which read inspection is executed by the first inspection unit 907 and the second inspection unit 908. The coordinate positions are represented by main and sub coordinates stored in the measurement position designation portion 1284 using position information from the sheet top represented by the numerical value of the roll delivery sheet information 1273 representing integrated length information from the roll top.

Alternatively, if the delivery form designated in PRX is cut finishing, the measurement position designation portion 1284 shows the relative coordinate positions of the barcode 920 from the origin, for which read inspection is executed by the first inspection unit 907 and the second inspection unit 908. The coordinate positions are represented by the sheet count from the start of the job represented by the numerical value of the cut sheet delivery sheet information 1274 and main and sub coordinates on the sheet corresponding to the count, which are stored in the measurement position designation portion 1284.

Figure 13:
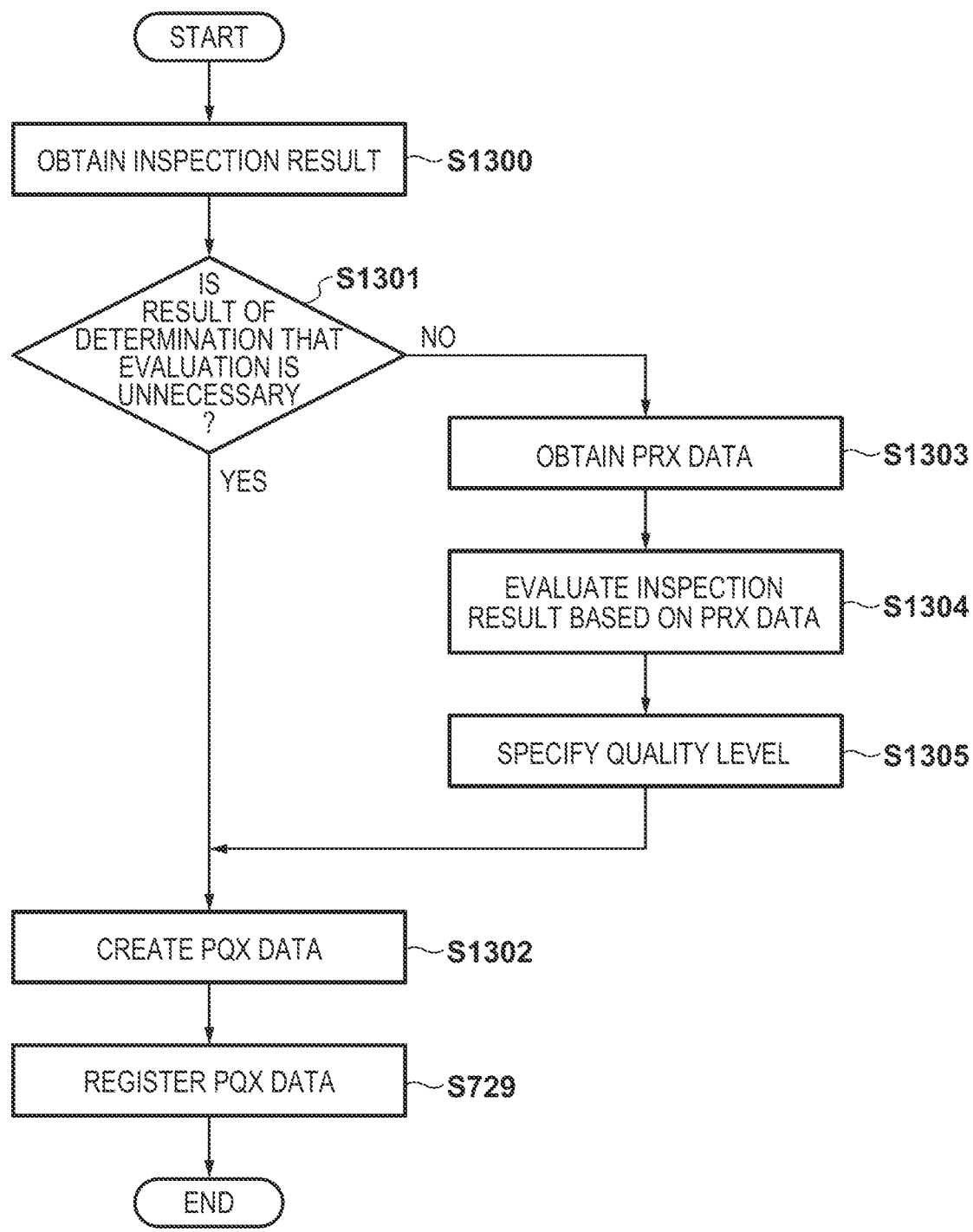
FIG. 13 is a flowchart of print quality report data creation processing according to the first embodiment.

Creation of PQX (FIG. 13)

PQX is created by the workflow control program 505 in the information processing apparatus 102 of the printing company system 100. When creating PQX, the workflow control program 505 determines an inspection result using PRX, puts determination results 1288 to 1290 determination results 1288 to 1290 (shown in FIG. 12H) in a determination result storage portion 1287, and inserts it to the PQX. Processing of inserting the determination result storage portion 1287 to PQX will be described below.

A procedure of processing of the workflow control unit 707 to create PQX in steps S728 and S729 shown in FIG. 7B will be described with reference to FIG. 13. The processing by the workflow control unit 707 shown in FIG. 13 is implemented by the CPU 301 executing the workflow control program 505.

In step S1300, the workflow control program 505 acquires an inspection result. In step S1301, it is judged whether to perform evaluation of the inspection result using PRX data. If evaluation is not to be performed, the process advances to step S1302. To perform evaluation, the process advances to step S1303. Note that as for the creation of judging whether to perform evaluation or not, if PRX data exists, evaluation may be performed, and the orderer may instruct in FIG. 10B, that is, in the orderer system 109. Alternatively, evaluation may be performed only when specific customer information is described in BuyerInfo of PRX data.

In step S1302, the workflow control program 505 creates PQX based on the inspection result. In this case, the evaluation result is not included in the PQX, but the measurement values of inspection items may be included. The description of step S729 has already been made with reference to FIG. 7 and will therefore be omitted.

On the other hand, upon determining that evaluation of the inspection result is necessary, in step S1303, the workflow control program 505 acquires PRX data associated with the inspection result.

In step S1304, based on the inspection result and a reference value described in PRX, the workflow control program 505 evaluates the inspection result of each inspection target item using the formulas described in the formula defining portions 1262, 1263, and 1264 of the inspection target items. In this example, the evaluation result is represented by the value of a rank. For example, a color, a character, a position deviation, and a barcode are included in evaluation target items. Some of these may be included, and an item other than these may be included, as a matter of course.

In step S1305, the workflow control program 505 specifies a quality level defining portion based on the evaluation result. That is, a label and a rank, which are defined by the quality level defining portion corresponding to the evaluation result, are specified. For example, in the example of PQX shown in FIGS. 12F to 12H, the workflow control program 505 records quality level defining portions specified from the PRX as the determination results 1288 to 1290 (see FIG. 12H). That is, the labels and ranks of the inspection target items evaluated in step S1304 are recorded in PQX as the values of the determination results 1288 to 1290. The workflow control program 505 creates the determination result storage portion 1287 and puts the determination results 1288 to 1290 as child elements in it. As shown in FIGS. 12F to 12H, the workflow control program 505 adds the determination result storage portion 1287 to the PQX.

This allows the PQX to hold not only an inspection result (that is, a measurement value) but also a determination result (or an evaluation result) calculated from the inspection result and the criterion.

As described above, the information processing apparatus shown in this embodiment adds the quality level defining portions of the target items such as a color, barcode read accuracy, and image position deviation accuracy described in PRX to PQX. This allows the orderer to know the degree of quality of the print state in comparison with the criterion of quality decided by the orderer himself/herself.

[Modification]

Note that in the first embodiment, PRX and PQX are used as examples of quality request data and print quality report data. However, the quality request data and the print quality report data can be expressed by any format. Hence, the present invention does not change depending on the data format. In addition, an item of comprehensive quality evaluation is not included in PQX. If a different format is used, a rank decided by performing comprehensive quality evaluation using the method described in the quality request data may be included in report data.

As an example, quality request data and print quality report data can be expressed by XJDF and XJMF formulated by CIP4 that is an international standard organization for the printing step. FIG. 14A shows an example of quality request data, and FIGS. 14B and 14C show an example of print quality report data.

For example, in the quality request data shown in FIG. 14A, reference numeral 1400 corresponds to the comprehensive quality goal setting information 1221 shown in FIG. 12B. Reference numerals 1401, 1403, 1405, and 1407 correspond to the quality level defining portions 1233, 1234, 1235, and 1236 shown in FIG. 12C. Reference numerals 1402, 1404, 1406, and 1408 correspond to the reference color detailed information defining portion 1257 that defines the color quality level in FIG. 12D. Also, in the print quality report data shown in FIG. 14B, reference numeral 1409 corresponds to the color quality report storage portion 1275 in FIG. 12G, and a reference numeral 1410 corresponds to the determination result 1288 in FIG. 12H.

As described above, the quality request data or the quality report data are not limited to PRX and PQX, and another format may be used.

Second Embodiment

In the first embodiment, an example in which the degree of quality of a color, barcode read accurately, and image position deviation accuracy are added to PQX has been described. On the other hand, if a plurality of quality items exist, as in the first embodiment, a person may want to know the degree of quality of an entire print product at a glance. In the second embodiment, an example in which the degree of quality of an entire print product is added to PQX will be described. Note that a description will be made while omitting portions common to the above-described embodiment.

When creating PQX in steps S728 and S729, first, a workflow control program 505 determines an inspection result using PRX data shown in FIGS. 12B to 12D. Then, the workflow control program 505 specifies a quality level defining portion for each axis such as a color, barcode read accuracy, or image position deviation accuracy. The description of this has been made in the first embodiment and will therefore be omitted.

After that, one of quality level defining portions 1222 to 1225 in a comprehensive quality goal setting information 1221 described in PRX is specified. The method of specifying the quality level in the comprehensive quality goal setting information is as described in the first embodiment, and a description thereof will be omitted here.

Next, as shown in FIGS. 12I to 12K, the workflow control program 505 puts a quality level defining portion 1291 of the comprehensive quality goal setting information specified from PRX as a child element of a determination result storage portion 1287 (see FIG. 12K). For example, in step S1305 of FIG. 13, the evaluation result (quality level) of each of the inspection target items is applied to an evaluation formula defined in a formula defining portion 1226 of the comprehensive quality goal setting information 1221 in PRX, thereby obtaining the result of comprehensive evaluation. A label and a rank as the evaluation result are recorded in the quality level defining portion 1291.

This allows the PQX to hold not only an inspection result but also the degree of quality of an entire print product.

As described above, an information processing apparatus shown in this embodiment can add comprehensive quality goal setting information described in PRX to PQX. This allows the orderer to know the degree of quality of the print state in comparison with the criterion of quality decided by the orderer himself/herself.

Third Embodiment

When an orderer requests a printing company to produce a print product, criteria of a minimum value and an expected value may explicitly be designated for the degree of quality of the print product. There are two types of acceptance criteria in PRX, that is, a minimum acceptable quality criterion (or a minimum criterion) and a desired quality criterion (or a desired criterion).

The minimum value can be expressed by minimum acceptable quality setting information (MinimumAcceptableRank) in PRX. In FIGS. 12B t 12D, pieces of minimum acceptable quality setting information 1227, 1237, 1246, and 1253 correspond to the minimum value. Pieces of desired quality setting information 1228, 1238, 1247, and 1254 correspond to the expected value in PRX. In the specifications of PRX, minimum acceptable quality setting information is an essential element, and desired quality setting information is arbitrary.

In PRX, two cases can be considered concerning the combination of the minimum acceptable setting information and the desired quality setting information, that is, a case in which only the minimum acceptable setting information is designated and a case in which both the minimum acceptable setting information and the desired quality setting information are designated can be considered. If only the minimum acceptable setting information is designated in PRX, it is often satisfactory for the orderer that the quality of the print product satisfies the minimum criterion. For example, as shown in FIGS. 12L to 12M, if only the minimum acceptable setting information 1237 exists in PRX, the quality of the print product expected by the orderer need only be equal to or more than a quality level defining portion 1235 indicated by the minimum acceptable setting information 1237. That is, any of a quality level defining portion 1233, a quality level defining portion 1234, and the quality level defining portion 1235 representing the acceptable quality can be described in PQX. Only the quality level defining portion 1235 may be included in PRX.

On the other hand, if both the minimum acceptable setting information and the desired quality setting information are designated, the orderer wants that the quality of the print product matches the desired quality setting information as much as possible. This is because the orderer has no choice but to set the minimum acceptable setting information, and does not expect that only print products of the quality of the minimum acceptable setting information are delivered. On the contrary, the orderer wants delivery in which print products whose quality is less than the quality level described in the desired quality setting information are included as little as possible. However, since the quality of a print product varies during the process of production, the orderer wants to completely grasp the degree of variation.

For example, if the minimum acceptable setting information 1237 and the desired color quality setting information 1238 exist in PRX, as shown in FIG. 12B to 12D, the quality of a print product expected by the orderer is the quality level defining portion 1233 indicated by the desired quality setting information 1238. Since the orderer wants delivery in which print products whose quality is less than the quality level defining portion 1233 are included as little as possible, there is also a requirement that the quality level defining portions 1233 to 1236 are correctly described in PQX.

Figure 16:
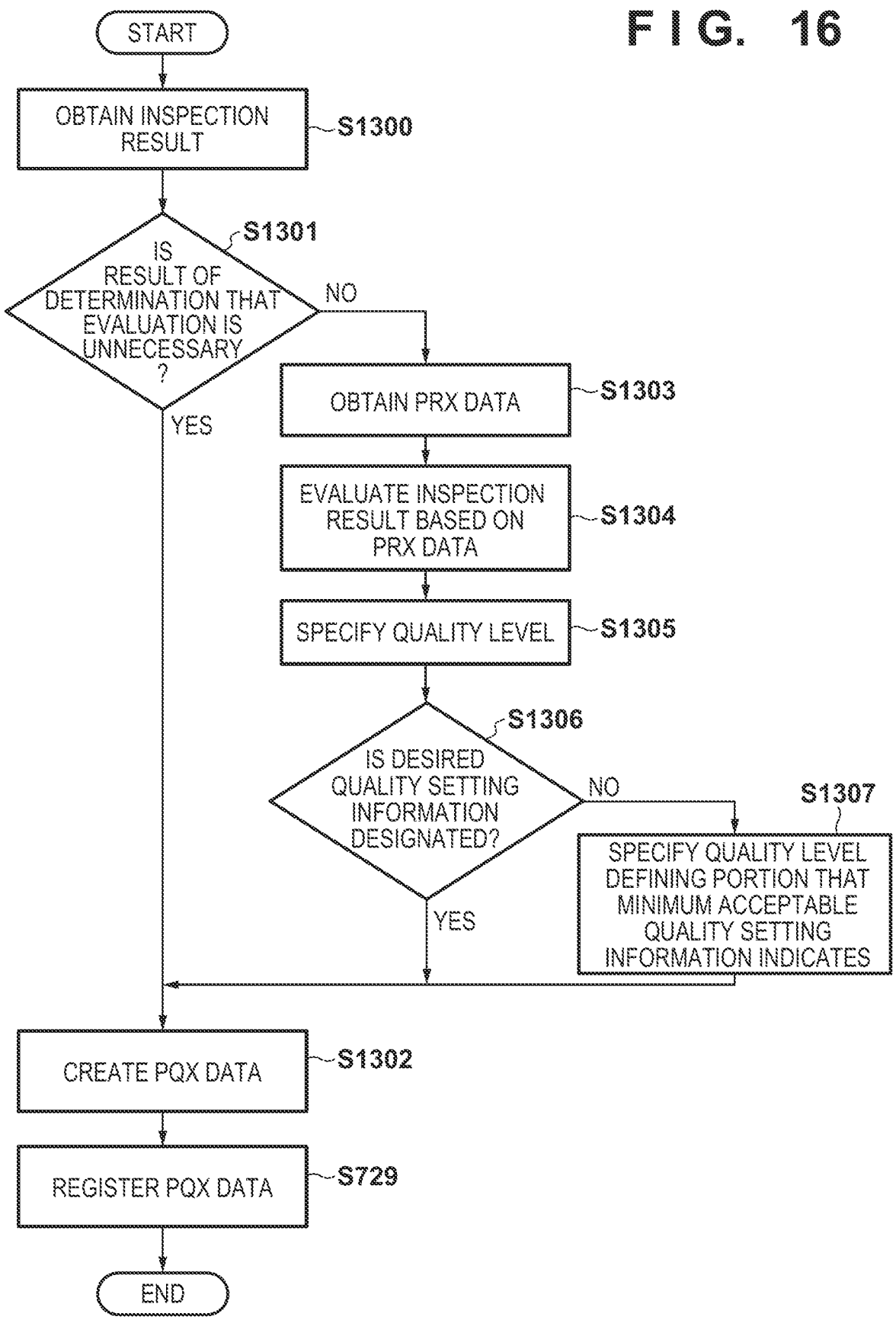
FIG. 16 is a flowchart of print quality report data creation processing according to the third embodiment.

Considering the above description, a creation procedure of PQX upon receiving PRX including minimum acceptable setting information and desired quality setting information will be described below. FIG. 16 shows the procedure. In FIG. 16, steps S1301 to S1305 and S729 are the same as in FIG. 13. Steps S1306 and S1307 that are different points will be described.

A case in which only minimum acceptable setting information is designated in PRX will be described. Processing up to step S1305 is ended, and the evaluation result of an inspection target item is recorded in PQX. After that, a workflow control program 505 determines the inspection result by referring to PRX shown in FIGS. 12L to 12M, and specifies the quality level defining portion. The description of quality level defining portion specifying processing has already been made in the first embodiment and will therefore be omitted. Note that in the first embodiment, the quality level defining portion 1234 (see FIG. 12M) is specified.

In step S1306, it is determined whether desired quality setting information is set. If only the minimum acceptable setting information 1237 (see FIG. 12L) is designated in PRX (NO in step S1306 of FIG. 13), the process branches to step S1307. In step S1307, the workflow control program 505 sets not the quality level defining portion 1234 but the quality level defining portion 1235 indicating the minimum acceptable setting information 1237 to a candidate to be described in PQX. As a result, in step S1302, not the quality level (and label) as the actual evaluation result but the quality level (and label) indicated by the minimum acceptable setting information is recorded as the evaluation result in PQX.

If both minimum acceptable setting information and desired quality setting information are designated, the same processing as described in the first embodiment is performed. That is, the quality level (and label) as the actual evaluation result is recorded in PQX.

As described above, an information processing apparatus shown in this embodiment can add a quality level according to minimum acceptable setting information and desired quality setting information described in quality request data to print quality report data. This allows the orderer to know the degree of quality of the print state in comparison with the criterion of quality decided by the orderer himself/herself. For example, if only minimum acceptable setting information is designated in quality request data, the orderer can know that the minimum acceptable setting information could be achieved. Since notifications of quality levels other than that are never made, the cumbersomeness of notifications to the orderer can be reduced.

Fourth Embodiment

At the time of order placement of a print product, the orderer may not allow variations of quality. In this case, the orderer may designate only one desired quality level in PRX and not describe quality levels other than that. For example, FIG. 12N shows PRX data including only one quality level defining portion 1233.

In such a use case, delivered print products always have predetermined quality, and there is no variation. That is, the orderer always receives PQX of the same result.

In this case, three methods of returning PQX from the printing company to the orderer can be considered.

In the first method, no quality level is put in PQX but only the inspection result is put in PQX, and the PQX including only an inspection result is returned to the orderer. This is the same as the conventional PQX.

In the second method, a quality level and an inspection result are put in PQX, and the PQX is returned to the orderer. This is the same as in the first embodiment. However, since there is only one quality level, only the inspection result changes within the range of error.

In the third method, since the quality level is always the same, no PQX is returned to the orderer. The orderer knows that the quality level is always the same. Hence, if information exchange by PQX is unnecessary, this method is used.

In this embodiment, switching of the above-described three methods is implemented by changing in the following way. That is, in step S1301 of FIG. 13, switching between the first method and the second method is performed. More specifically, if an instruction representing the necessity of a report is input on the orderer application screen shown in FIG. 10, print quality report data is created. If an instruction representing that a report is unnecessary is input, print quality report data is not created. This is the same as in the first embodiment. As for the third method, before PQX creation processing is started in step S729, it is judged whether to create PQX or not. This judgement may be done for each inspection target item. As the judgment criterion, for example, it is judged whether the minimum criterion designated in PRX is the highest level (for example, 10). If the designated minimum criterion is the highest quality level, it can be determined that a variation of quality level is not permitted, and a delivered print product always has the highest quality level. Hence, in this case, the evaluation result (a label and a rank) of the item need not be included in created PQX.

As described above, an information processing apparatus shown in this embodiment can create and distribute print quality report data meeting the requirements of the orderer if only one quality level is described in the quality report data.

Fifth Embodiment

An orderer and a printing company sometimes discuss the finish of print quality while comparing information described in print quality report data and a print product sample. In this discussion, since even a sheet rejected as waste paper can be used as non-defective paper depending on the degree of NG, the orderer and the printing company check and return sheets that seem to be usable. If this check work is performed based on only an inspection result and a quality level determination result, time is taken. For this reason, it is sometimes necessary to know why the information described in the print quality report data, particularly, the print quality level determination result is obtained. This is because depending on the reason, waste paper can be returned as non-defective paper.

Hence, in this embodiment, processing of creating print quality report data including the reason of a determination result will be described. Calculation of color quality level is used as an example.

In the first embodiment, when calculating a color quality level, using the formula defined in the formula defining portion 1262, the spectral spectrum information storage portion 1259 and the spectral spectrum data storage portion 1285 are compared, thereby calculating the difference. For example, if the calculation result is 1.5, the quality level defining portion 1234 is specified. On the other hand, since the numerical value described in the quality level defining portion 1234 is 2.0, 1.5 that is the actual calculation result is rounded to 2.0.

Hence, as shown in a reason field 1500 of PQX shown in FIGS. 15A and 15B, for the item of the quality level, a formula 1502 used to determine the inspection result and a calculation result 1501 obtained by applying the measurement value to the formula 1502 are described in PQX. This facilitates specifying the calculation reason of the determination result described in the print quality report data. Note that the formula 1502 is acquired from quality request data (PRX), and in the example shown in FIG. 12B, acquired from a formula defining portion 1262.

Also, comprehensive inspection results 1503 to 1505 representing comprehensive quality include the formula 1505 and the calculation result 1504. The formula 1505 is acquired from a formula 1226 described in comprehensive quality goal setting information 1221. The calculation result 1504 can be a value obtained by applying the evaluation result of each item to the formula 1505 when evaluating the comprehensive quality level. In FIG. 13, the above-described processing is performed in step S1302.

Note that in this embodiment, as the reason of the determination result included in the print quality report data, the formula and the calculation result, that is, the evaluation method and the evaluation result are added. However, any information showing the reason of the determination result can be used. That is, the reason is not limited to the formula and the calculation result. Additionally, the reason may be added not to all inspection targets but to a selected inspection target, or the reason may be added to a predetermined inspection target.

As described above, an information processing apparatus shown in this embodiment can add the reason of a determination result to print quality report data. This allows the orderer and the printing company to discuss the finish of print quality while comparing a determination result and a reason thereof described in print quality report data and a print product sample.

According to the present invention, the orderer can know the degree of quality of the print state in comparison with reference of quality decided by the orderer himself/herself. For example, when sorting print products, those whose degree of quality of the print state is high can easily be sorted.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
   at least one processor; and
   at least one memory in which at least one program is stored, wherein the at least one program is configured to cause the at least one processor to:
   acquire an inspection result obtained by inspecting a printed product;
   determine whether an evaluation of the acquired inspection result is to be performed;

in a first case where it is determined that the evaluation of the acquired inspection result is to be performed:
receive quality request data from an external apparatus, the quality request data including an evaluation criterion;
specify a quality level of the printed product based on both of the evaluation criterion included in the quality request data received from the external apparatus and the acquired inspection result;
create first quality report data including both of the acquired inspection result and the quality level of the printed product specified based on the both of the evaluation criterion included in the quality request data received from the external apparatus and the acquired inspection result; and
transmit the first quality report data to the external apparatus; and
in a second case where it is determined that the evaluation of the acquired inspection result is not to be performed:
create second quality report data including the acquired inspection result and excluding a specified quality level of the printed product; and
transmit the second quality report data to the external apparatus.

2. The information processing apparatus according to claim 1, wherein
the inspection result is acquired from each of a plurality of inspection units for inspecting the quality of a plurality of items of the printed product, and
the quality level is specified based on the inspect result for each of the plurality of items of the printed product.

3. The information processing apparatus according to claim 2, wherein
the plurality of items include at least one of a color of the printed product, a position deviation of the printed product, and readability of a printed barcode.

4. The information processing apparatus according to claim 2, wherein
the quality level for each of the plurality of items and a comprehensive quality level that combines the quality levels for each of the plurality of items are further specified.

5. The information processing apparatus according to claim 2, wherein
the evaluation criterion includes a desired criterion that is preferably satisfied, in addition to a minimum criterion to be satisfied for at least some of the plurality of items, and
for an item among the plurality of items whose desired criterion is not included in the evaluation criterion, the first quality report data further includes a quality level corresponding to the minimum criterion for the item.

6. The information processing apparatus according to claim 2, wherein
in the evaluation criterion, a quality level to be satisfied for each of the plurality of items is designated, and
for an item among the plurality of items for which one quality level to be satisfied is designated in the evaluation criterion, the quality level of the item is not included in the first quality report data.

7. The information processing apparatus according to claim 2, wherein
for at least one of the plurality of items, the first quality report data further indicates an evaluation method used to evaluate the inspection result to obtain an evaluation result and the evaluation result.

8. The information processing apparatus according to claim 1, wherein the at least one program further causes the at least one processor to:
receive print instruction data and the evaluation criterion from the external apparatus; and
manage printing and inspection of the printed product in accordance with the print instruction data.

9. The information processing apparatus according to claim 1, wherein
the external apparatus is a server configured to provide the first quality report data to a terminal apparatus.

10. The information processing apparatus according to claim 1, wherein the at least one program further causes the at least one processor to:
in the first case where it is determined that the evaluation of the acquired inspection result is to be performed:
determine whether desired quality setting information is designated in the quality request data received from the external apparatus in addition to minimum acceptable setting information being designated in the quality request data received from the external apparatus;
specify, in a case where it is determined that the desired quality setting information is not designated in the quality request data received from the external apparatus in addition to the minimum acceptable setting information, a quality level defining portion indicated by the minimum acceptable setting information; and
create the first quality report data including all of the acquired inspection result, the quality level of the printed product specified based on the both of the evaluation criterion included in the quality request data received from the external apparatus and the acquired inspection result, and the quality level indicated by the minimum acceptable setting information.

11. A non-transitory computer-readable storage medium in which at least one program is stored, wherein the at least one program is configured to cause a computer to:
acquire an inspection result obtained by inspecting a printed product;
determine whether an evaluation of the acquired inspection result is to be performed;
in a first case where it is determined that the evaluation of the acquired inspection result is to be performed:
receive quality request data from an external apparatus, the quality request data including an evaluation criterion;
specify a quality level of the printed product based on both of the evaluation criterion included in the quality request data received from the external apparatus and the acquired inspection result;
create first quality report data including both of the acquired inspection result and the quality level of the printed product specified based on the both of the evaluation criterion included in the quality request data received from the external apparatus and the acquired inspection result; and
transmit the first quality report data to the external apparatus; and
in a second case where it is determined that the evaluation of the acquired inspection result is not to be performed:
create second quality report data including the acquired inspection result and excluding a specified quality level of the printed product; and transmit the second quality report data to the external apparatus.

12. A workflow system comprising:
an information processing apparatus;
an image forming apparatus;
an inspection apparatus configured to inspect a quality of a printed product generated by the image forming apparatus, wherein
the information processing apparatus comprising:
at least one processor; and
at least one memory in which at least one program is stored, wherein the at least one program is configured to cause the at least one processor to:
acquire an inspection result obtained by inspecting a printed product;
determine whether an evaluation of the acquired inspection result is to be performed;
in a first case where it is determined that the evaluation of the acquired inspection result is to be performed:
receive quality request data from an external apparatus, the quality request data including an evaluation criterion;
specify a quality level of the printed product based on both of the evaluation criterion included in the quality request data received from the external apparatus and the acquired inspection result;
create first quality report data including both of the acquired inspection result and the quality level of the printed product specified based on the both of the evaluation criterion included in the quality request data received from the external apparatus and the acquired inspection result; and
transmit the first quality report data to the external apparatus; and
in a second case where it is determined that the evaluation of the acquired inspection result is not to be performed:
create second quality report data including the acquired inspection result and excluding a specified quality level of the printed product; and
transmit the second quality report data to the external apparatus.

13. A quality report data creation method performed by an information processing apparatus, the method comprising:
acquiring an inspection result obtained by inspecting a printed product;
determining, in a first case, that an evaluation of the acquired inspection result is to be performed, and then:
receiving quality request data from an external apparatus, the quality request data including an evaluation criterion;
specifying a quality level of the printed product based on both of the evaluation criterion included in the quality request data received from the external apparatus and the acquired inspection result;
creating first quality report data including both of the acquired inspection result and the quality level of the printed product specified based on the both of the evaluation criterion included in the quality request data received from the external apparatus and the acquired inspection result; and
transmitting the first quality report data to the external apparatus; and
determining, in a second case, that the evaluation of the acquired inspection result is not to be performed, and then:
creating second quality report data including the acquired inspection result and excluding a specified quality level of the printed product; and
transmitting the second quality report data to the external apparatus.

\* \* \* \* \*